(12) United States Patent
Yachi et al.

(10) Patent No.: US 6,484,576 B2
(45) Date of Patent: Nov. 26, 2002

(54) TUNING-FORK VIBRATORY GYRO

(75) Inventors: Masanori Yachi, Kawasaki (JP); Yoshio Satoh, Kawasaki (JP); Masaaki Ono, Kawasaki (JP); Yoshiro Fujiwara, Kawasaki (JP); Sumio Yamada, Kawasaki (JP); Hiroshi Ishikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/741,834

(22) Filed: Dec. 22, 2000

(65) Prior Publication Data

US 2001/0000853 A1 May 10, 2001

Related U.S. Application Data

(62) Division of application No. 08/803,497, filed on Feb. 20, 1997, now Pat. No. 6,253,613.

(30) Foreign Application Priority Data

Feb. 21, 1996 (JP) ............................... 8-033994
Jul. 31, 1996 (JP) ............................... 8-202569

(51) Int. Cl.[7] ............................................. G01P 9/04
(52) U.S. Cl. ..................................... 73/504.16; 310/370
(58) Field of Search ........................ 73/504.16, 504.12, 73/504.04; 310/316, 329, 365, 366, 367, 370

(56) References Cited

U.S. PATENT DOCUMENTS

| 4,930,351 A | 6/1990 | Macy | 73/504.16 |
|---|---|---|---|
| 5,166,571 A | 11/1992 | Konno | 73/504.16 |
| 5,329,816 A | 7/1994 | Soderkvist et al. | 73/504.16 |
| 5,386,726 A | 2/1995 | Terajima | 73/504.16 |
| 5,388,458 A | 2/1995 | Weinberg et al. | 73/504.16 |
| 5,522,249 A | 6/1996 | Macy | 73/504.16 |
| 5,719,460 A | * 2/1998 | Watarai et al. | 73/504.16 |
| 5,854,427 A | * 12/1998 | Terada et al. | 73/504.16 |
| 5,970,793 A | * 10/1999 | Nakajima | 73/504.16 |
| 5,987,987 A | * 11/1999 | Watarai et al. | 73/504.16 |
| 5,996,410 A | * 12/1999 | Yachi et al. | 73/504.16 |

FOREIGN PATENT DOCUMENTS

| JP | 60-239613 | 11/1985 |
|---|---|---|
| JP | 61-258110 | 11/1986 |
| JP | 62-188975 | 8/1987 |
| JP | 62-217115 | 9/1987 |
| JP | 2-163608 | 6/1990 |
| JP | 2-163611 | 6/1990 |
| JP | 6-50760 | 2/1994 |
| JP | 6-147899 | 5/1994 |
| JP | 6-294654 | 10/1994 |
| JP | 7-110337 | 4/1995 |
| JP | 7-128067 | 5/1995 |
| JP | 8-5382 | 1/1996 |

* cited by examiner

*Primary Examiner*—Helen Kwok
(74) *Attorney, Agent, or Firm*—Arent Fox Kintner Plotkin & Kahn, PLLC

(57) ABSTRACT

A tuning-fork vibratory gyro has first and second arms and a base integrally connected to the first and second arms. The gyro includes drive electrodes used to generate tuning-fork vibrations due to a piezoelectric transversal effect, and detection electrodes provided on the first and second arms and used to output a detection voltage due to an angular velocity.

10 Claims, 31 Drawing Sheets

CAPACITANCE RATIO
 275 FOR DRIVE ELECTRODES
 554 FOR DETECTION ELECTRODES

CAPACITANCE RATIO
 56 FOR DRIVE ELECTRODES
 2199 FOR DETECTION ELECTRODES

CAPACITANCE RATIO
  1899 FOR DRIVE ELECTRODES
   100 FOR DETECTION ELECTRODES

FIG. 4A PRIOR ART
FIG. 4B PRIOR ART
FIG. 4C PRIOR ART
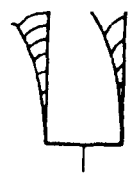
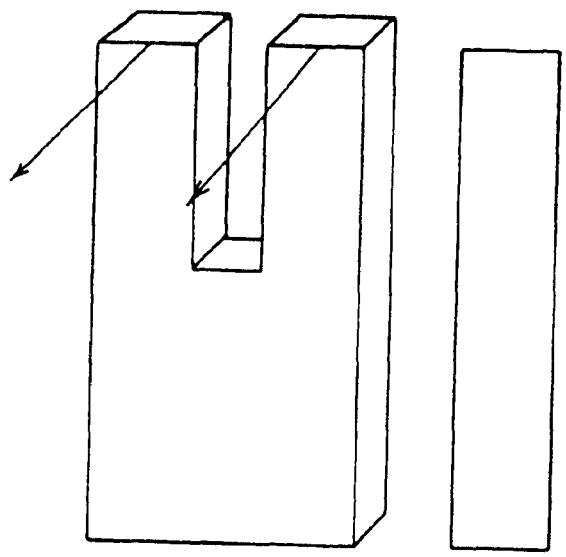
FIG. 4D PRIOR ART
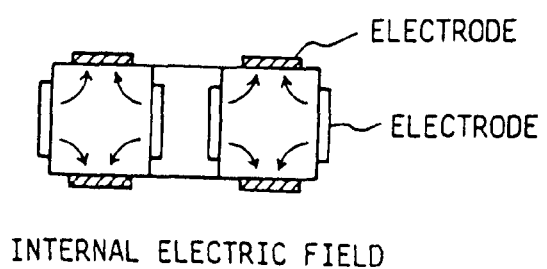
INTERNAL ELECTRIC FIELD

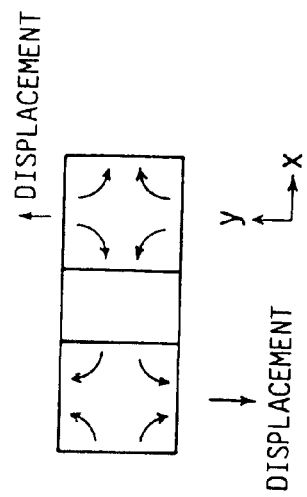
FIG. 5C
DRIVE MODE
FIG. 5D
CORIOUS FORCE OCCURS
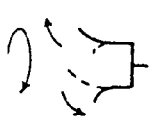
FIG. 5E
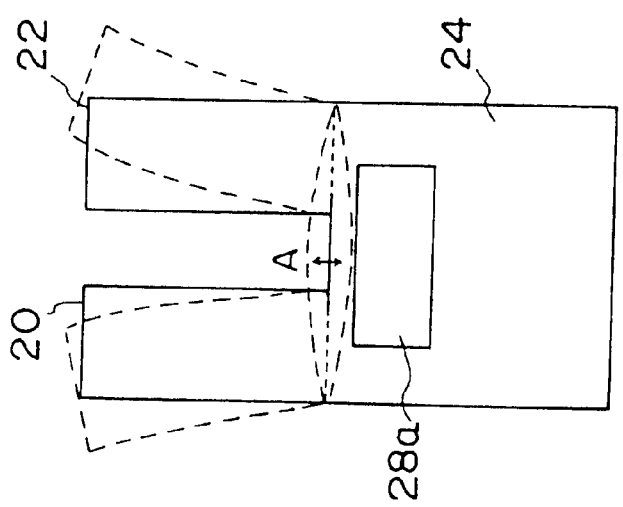
FIG. 5A
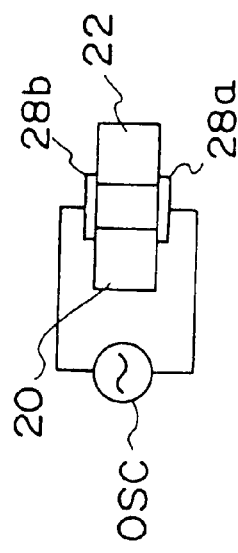
FIG. 5B

⊖ VOLTAGE IS OUTPUT
ONLY WHEN GYRO IS
VIBRATED, AS SHOWN
⊕ IN FIG. 8A

FIG. 10A
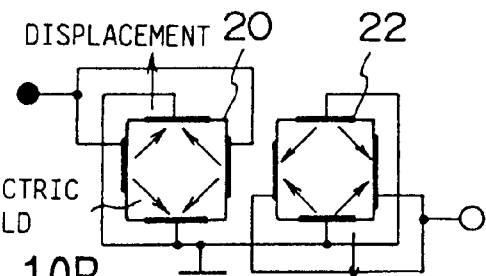
FIG. 10B
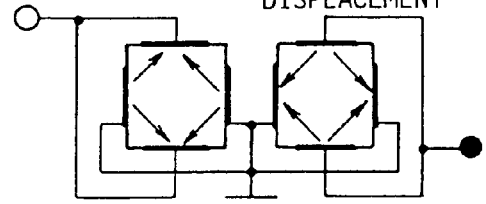
FIG. 10C
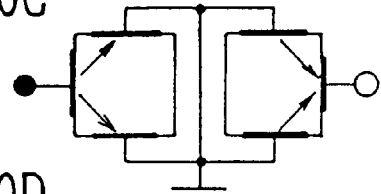
FIG. 10D
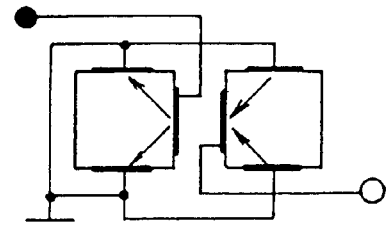
FIG. 10E
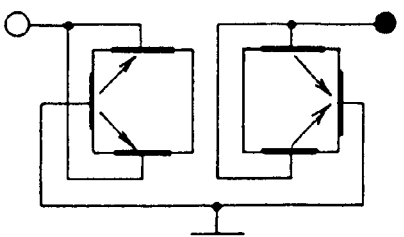
FIG. 10F
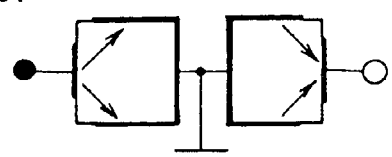
FIG. 10G  ● + OUTPUT
○ − OUTPUT
⊥ REFERENCE POTENTIAL
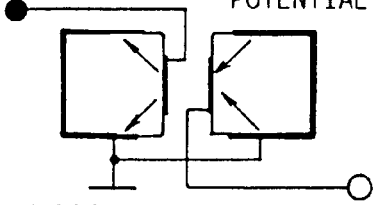
FIG. 10H
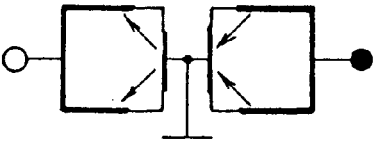
FIG. 10I
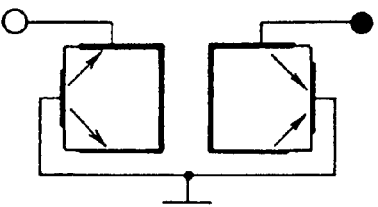
FIG. 10J
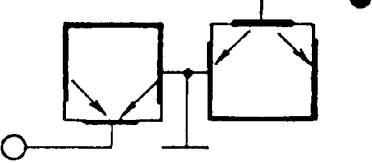
FIG. 10K
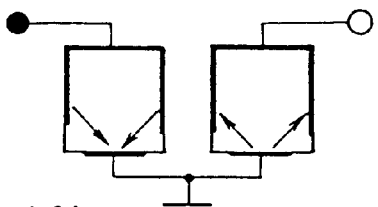
FIG. 10L
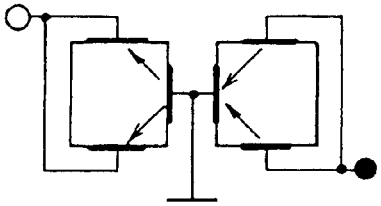

FIG. 11A
DISPLACEMENT
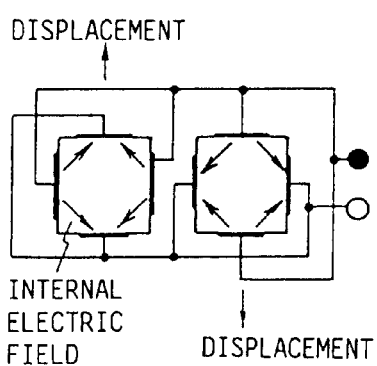
INTERNAL ELECTRIC FIELD    DISPLACEMENT
FIG. 11E    ● + OUTPUT
            ○ − OUTPUT
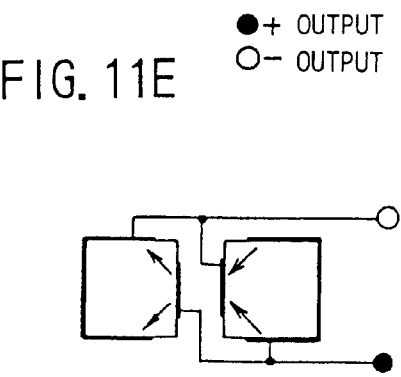
FIG. 11B
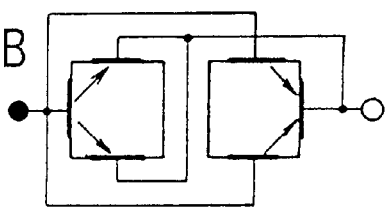
FIG. 11F
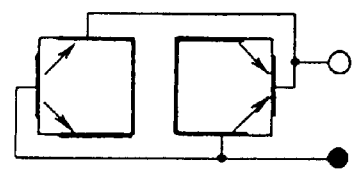
FIG. 11C
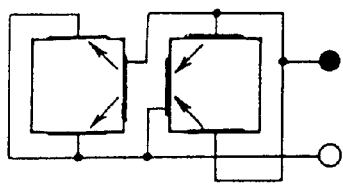
FIG. 11G
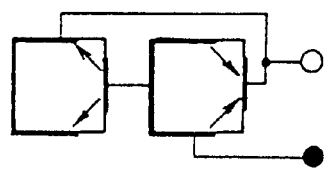
FIG. 11D
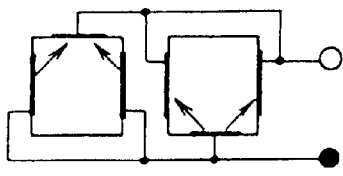

FIG. 12A    FIG. 12B    FIG. 12C
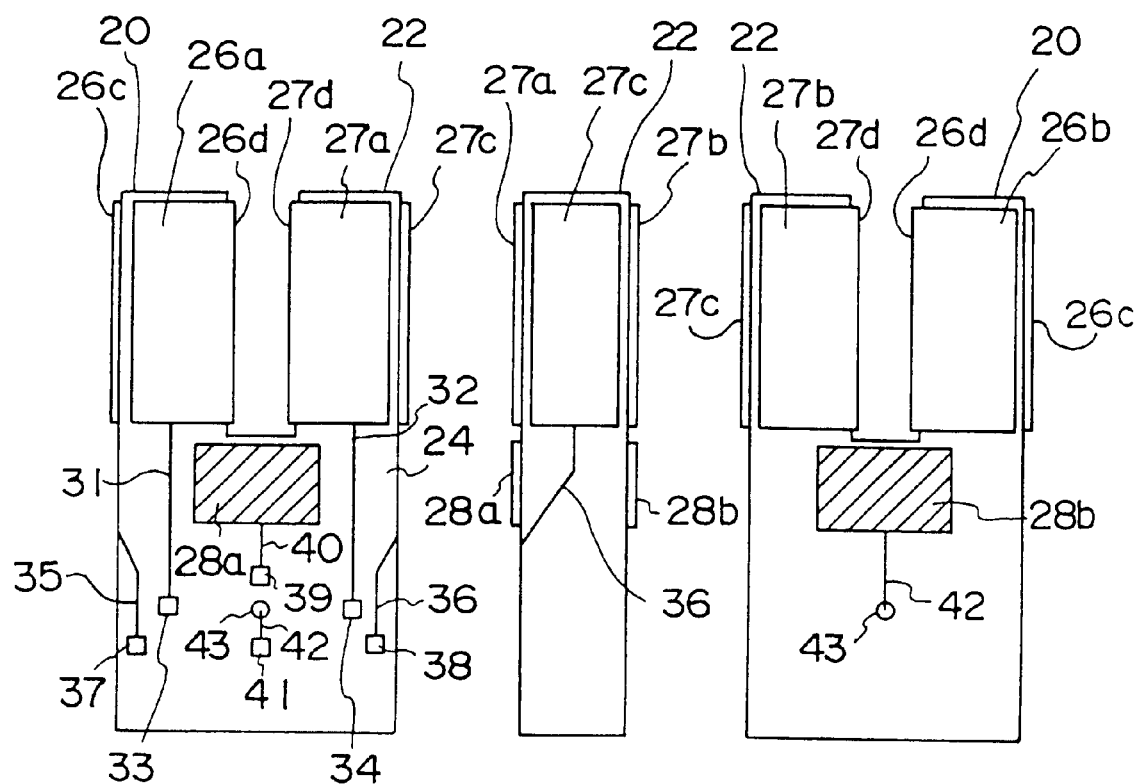
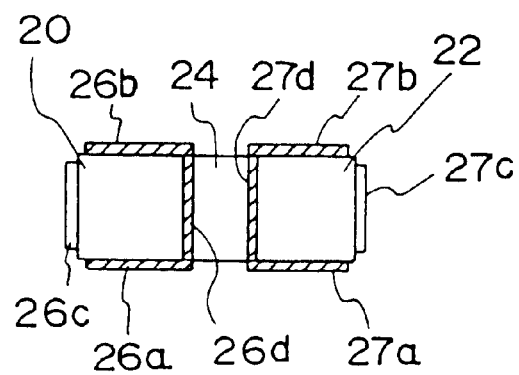
FIG. 12D

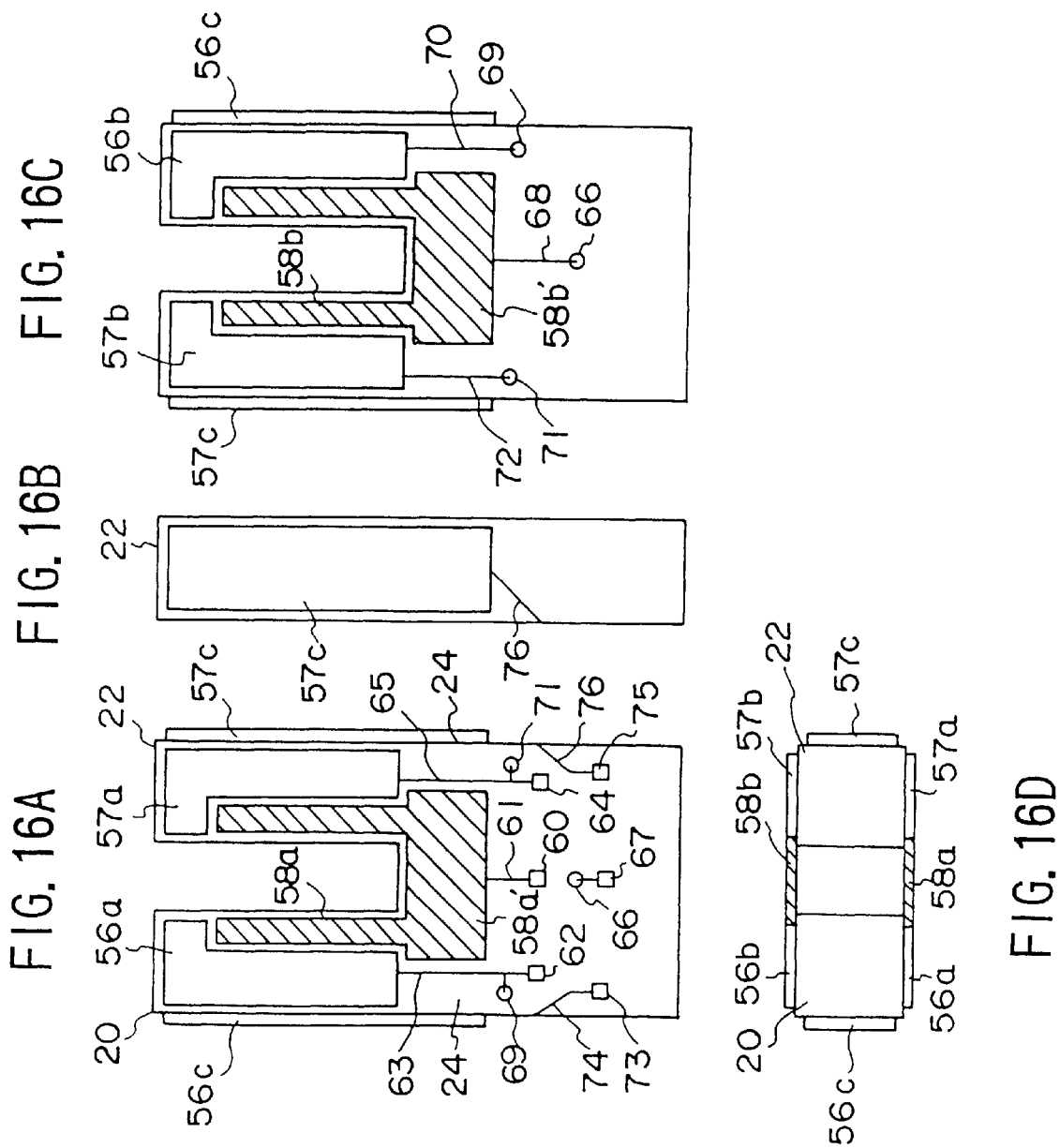

⊥ REFERENCE POTENTIAL

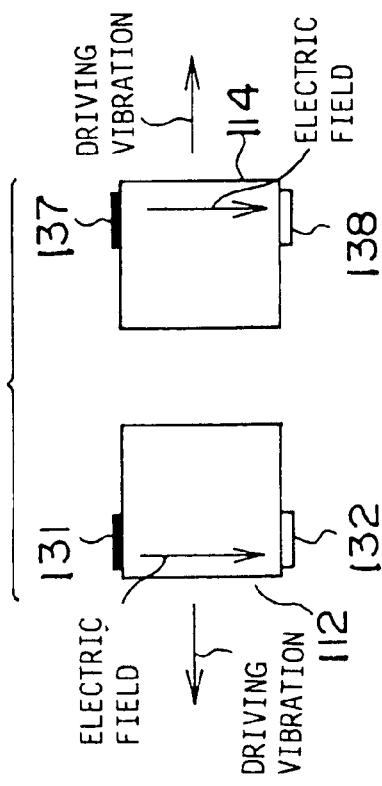
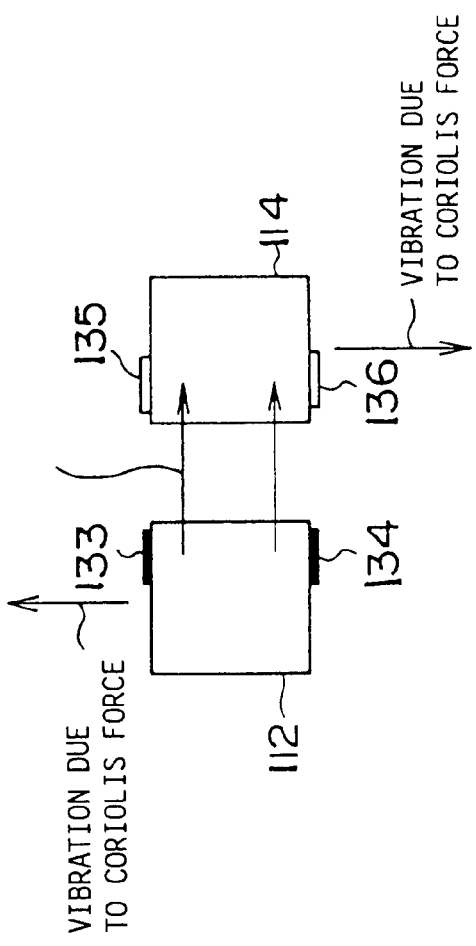
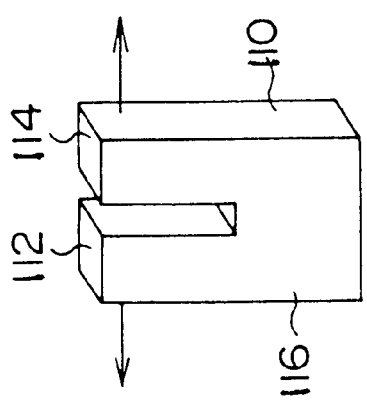
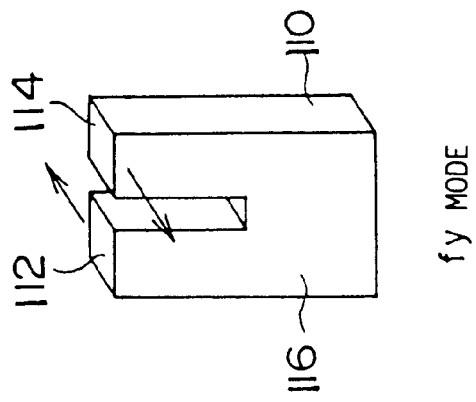

Potential: $A = -D = -E = H > -B = C = F = -G$

Potential: $A = -E > -B = -D = F = H > C = G$

LiTaO3 : θ = 40°
(Y' = 40° Y)

LiNbO : θ = 50°
(Y' = 50° Y)

TUNING-FORK VIBRATORY GYRO

This is a Division of application Ser. No. 08/803,497 filed Feb. 20, 1997 now U.S. Pat. No. 6,253,613. The disclosure of the prior application is hereby incorporated by reference herein in its entirety.

BACKGROUND OF THE INVENTION

Field of the Invention

The present invention generally relates to tuning-fork type vibratory gyros, and more particularly to a tuning-fork type vibratory gyro having a piezoelectric substance.

A gyroscope has been used to identify the current position of a vehicle such as an airplane, a ship or a satellite. Recently, a gyroscope has been applied to devices for personal use, such as car navigation and vibration detection in video cameras and still cameras.

A conventional coma gyro detects an angular velocity by utilizing a principle in which a rotating coma (disk) continues to rotate without any change of the attitude thereof while keeping the rotation axis even when a device equipped with the coma gyro is tilted. Recently, an optical type gyro and a piezoelectric type gyro have been developed and reduced to practical use. The principles of the piezoelectric type gyro were proposed around 1950. Various piezoelectric type gyros having, for example, a tuning fork, a cylinder or a semi-spherical member have been proposed. Recently, a vibratory gyro having a piezoelectric member has been in practical use. Such a vibratory gyro has less measurement sensitivity and precision than those of the coma gyro and the optical gyro, but has advantages in terms of size, weight and cost.

FIG. 1 shows a tune fork type vibratory gyro utilizing a piezoelectric single crystal, as disclosed in U.S. Pat. No. 5,329,816. The vibratory gyro shown in FIG. 1 (which is also referred to as a gyro element) includes a piezoelectric single crystal having two arms 10 and 12 and a base 14 supporting the arms 10 and 12. The arms 10 and 12 and the base are integrally formed. A drive electrode 18 for driving a tuning-fork vibration is provided on the arm 12, while a detection electrode 16 for detecting the angular velocity is provided on the arm 10. In the following description, the surface of the gyro appearing in FIG. 1 is referred to as a front surface, while the surface opposite to the front surface is referred to as a back surface. The drive electrode 18 has two electrode portions provided on the front surface of the gyro.

FIG. 2 shows a tune fork type vibratory gyro having a different electrode arrangement from that of the gyro shown in FIG. 1. Such a gyro is disclosed in, for example, U.S. Pat. No. 5,251,483. In FIG. 2, the arm 10 has the detection electrode 16 and the drive electrode 18, and similarly the arm 12 has the detection electrode 16 and the drive electrode 18. The detection electrodes 16 are located closer to the free ends of the arms 10 and 12 than the base 14. In an electrode arrangement shown in FIG. 3, the detection electrodes 16 are located closer to the base 14 than the free ends of the arms 10 and 12.

The capacitance ratios of the gyros shown in FIGS. 1, 2 and 3 are provided in these figures.

However, the gyros shown in FIGS. 1, 2 and 3 have the following respective disadvantages.

The gyro shown in FIG. 1 has the electrode arrangement in which the detection electrode 16 is provided symmetrically with the drive electrode 18. Hence, the capacitance ratios with respect to the drive electrode 18 and the detection electrode 16 are small. However, an unwanted vibration such as a curvature movement is output.

This disadvantage will now be described in detail with reference to FIGS. 4A through 4D. FIG. 4A is a perspective view of the gyro shown in FIG. 1 in which an unwanted vibration is illustrated. FIG. 4B is a side view of the gyro shown in FIG. 4A. FIG. 4C illustrates the unwanted vibration. FIG. 4D shows the electric field caused in the arms 10 and 12 by the unwanted vibration. The electrodes are omitted in FIGS. 4A through 4C. In FIG. 4D, the electrodes with no hatching are at an identical potential, and the electrodes with hatching are at another identical potential. Since the detection electrode 16 is provided on the arm 10 only, the potential difference generated by the electric field shown in FIG. 4D develops. The above potential difference serves as noise, which degrades the detection accuracy. Further, the unwanted vibration may include a torsional vibration, which is a factor causing a temperature drift. Furthermore, a leakage output may occur due to a mechanical coupling and/or electrostatic coupling between the detection-side arm and the drive-side arm.

In the electrode arrangement shown in FIG. 2, a reduction in the drive voltage can be realized because the capacitance ratio with respect to the drive electrodes 18 is small. Further, the detection electrodes 16 are provided on the arms 10 and 12, so that the unwanted vibration can be canceled and the leakage output is small. However, the capacitance ratios obtained at the free ends of the arms 10 and 12 are as large as approximately twenty times those obtained at the root portions thereof, and the sensitivity is thus small. Furthermore, the wiring lines extending from the detection electrodes 16 and the drive electrodes 18 are complex and the productivity is not high because the detection electrodes 16 and the drive electrodes 18 are provided on the arms 10 and 12.

The electrode arrangement shown in FIG. 3 enables high sensitivity because the capacitance ratio with respect to the detection electrodes 16 is small. However, a high drive voltage is required because the capacitance ratio with respect to the drive electrodes 18 is high. Furthermore, the wiring lines extending from the detection electrodes 16 and the drive electrodes 18 are complex and the productivity is not high because the detection electrodes 16 and the drive electrodes 18 are provided on the arms 10 and 12.

SUMMARY OF THE INVENTION

It is a general object of the present invention to eliminate the above disadvantages.

A more specific object of the present invention is to provide a tuning-fork vibratory gyro which is highly sensitive and accurate and is suitable for mass production.

The above objects of the present invention are achieved by a tuning-fork vibratory gyro having first and second arms and a base integrally connected to the first and second arms, the tuning-fork vibratory gyro comprising: drive electrodes used to generate tuning-fork vibrations due to a piezoelectric transversal effect; and detection electrodes provided on the first and second arms and used to output a detection voltage due to an angular velocity.

The tuning-fork vibratory gyro may be configured so that the detection electrodes are respectively provided on opposite surfaces of the base.

The tuning-fork vibratory gyro may be configured so that the detection electrodes have first portions provided on inner portions of first and second surfaces of each of the first and second arms opposite to each other and second portions provided on first and second surfaces of the base opposite to each other, the first and second portions being integrally formed.

The tuning-fork vibratory gyro may be configured so that the detection electrodes have first portions provided on outer portions of first and second surfaces of each of the first and second arms opposite to each other and second portions provided on first and second surfaces of the base opposite to each other, the first and second portions being integrally formed.

The tuning-fork vibratory gyro may be configured so that the detection electrodes are provided on at least three surfaces of each of the first and second arms.

The tuning-fork vibratory gyro may be configured so that the detection electrodes are connected so as to form first and second groups, the detection voltage corresponding to a difference between potentials of the first and second groups.

The tuning-fork vibratory gyro may be configured so that the detection electrodes are connected so as to form first, second and third groups, the detection voltage corresponding to a potential difference between a potential of the first group and a potential of the second group as well as a potential difference between the potential of the first group and a potential of the third group.

The tuning-fork vibratory gyro may be configured so that the detection electrodes are provided on first and second surfaces of each of the first and second arms opposite to each other.

The tuning-fork vibratory gyro may be configured so that the detection electrodes are provided on outer portions of the first and second surfaces of each of the first and second arms.

The tuning-fork vibratory gyro may be configured so that the detection electrodes are provided on inner portions of the first and second surfaces of each of the first and second arms.

The tuning-fork vibratory gyro may be configured so that the first and second arms and the base are integrally formed of a piezoelectric single crystal.

The above objects of the present invention are also achieved by a tuning-fork vibratory gyro having first and second arms and a base integrally connected to the first and second arms, the tuning-fork vibratory gyro comprising: drive electrodes used to generate tuning-fork vibrations due to a piezoelectric transversal effect, the drive electrodes being provided on at least one of first and second surfaces of each of the first and second arms opposite to each other; detection electrodes provided on at least one of the first and second surfaces of each of the first and second arms and used to output a detection voltage due to an angular velocity; and reference electrodes provided on at least one of the first and second surfaces of each of the first and second arms and connected to a reference potential.

The above tuning-fork vibratory gyro may be configured so that: the drive electrodes are provided on the first surfaces of the first and second arms; the detection electrodes are provided on the second surfaces of the first and second arms; and the detection voltage corresponds to a potential difference between the detection electrodes with respect to the reference potential.

The tuning-fork vibratory gyro may be configured so that: the drive electrodes are provided on the first surfaces of the first and second arms; the detection electrodes are provided on the first surfaces of the first and second arms; and the detection voltage corresponds to a potential difference between the detection electrodes with respect to the reference potential.

The tuning-fork vibratory gyro may be configured so that: the detection electrodes are provided on the first and second surfaces of each of the first and second arms; and the detection voltage corresponds to a potential difference between the detection electrodes with respect to the reference potential.

The tuning-fork vibratory gyro may be configured so that the drive electrodes also function as the detection electrodes, so that the detection voltage can be output via the drive electrodes.

The tuning-fork vibratory gyro may be configured so that the drive electrodes also function as the detection electrodes, and are provided on either the first surface or the second surface of each of the first and second arms, so that the detection voltage can be output via the drive electrodes.

The tuning-fork vibratory gyro may be configured so that the drive electrodes also function as the detection electrodes, and are provided on both the first and second surfaces of each of the first and second arms, so that the detection voltage can be output via the drive electrodes.

The tuning-fork vibratory gyro may be configured so that the first and second arms and the base are integrally formed of a piezoelectric single crystal.

The tuning-fork vibratory gyro may be configured so that the piezoelectric single crystal is a $LiTaO_3$ 40°±20° rotation Z plate.

The tuning-fork vibratory gyro may be configured so that the piezoelectric single crystal is a $LiNbO_3$ 50°±20° rotation Z plate.

BRIEF DESCRIPTION OF THE DRAWINGS

Other objects, features and advantages of the present invention will become more apparent from the following detailed description when read in conjunction with the accompanying drawings, in which:

FIGS. 4A, 4B, 4C and 4D are diagrams showing disadvantages of the conventional tuning-fork vibratory gyros;

FIGS. 5A, 5B, 5C, 5D and 5E are diagrams explaining the principle of the present invention;

FIGS. 10A, 10B, 10C, 10D, 10E, 10F, 10G, 10H, 10J, 10K and 10L are diagrams of arrangements of the electrodes shown in FIGS. 9A and 9B and connections thereof;

FIGS. 11A, 11B, 11C, 11D, 11E, 11F and 11G are diagrams of other arrangements of the electrodes shown in FIGS. 9A and 9B and connections thereof;

FIGS. 12A, 12B, 12C and 12D are diagrams of a tuning-fork vibratory gyro having the electrode arrangement shown in FIG. 11G;

FIGS. 16A, 16B, 16C and 16D are diagrams of a variation of the structure shown in FIGS. 14A, 14B and 14C;

FIGS. 21A, 21B, 21C and 21D are diagrams of the principle of a tuning-fork vibratory gyro;

DESCRIPTION OF THE PREFERRED EMBODIMENTS

Figure 23:
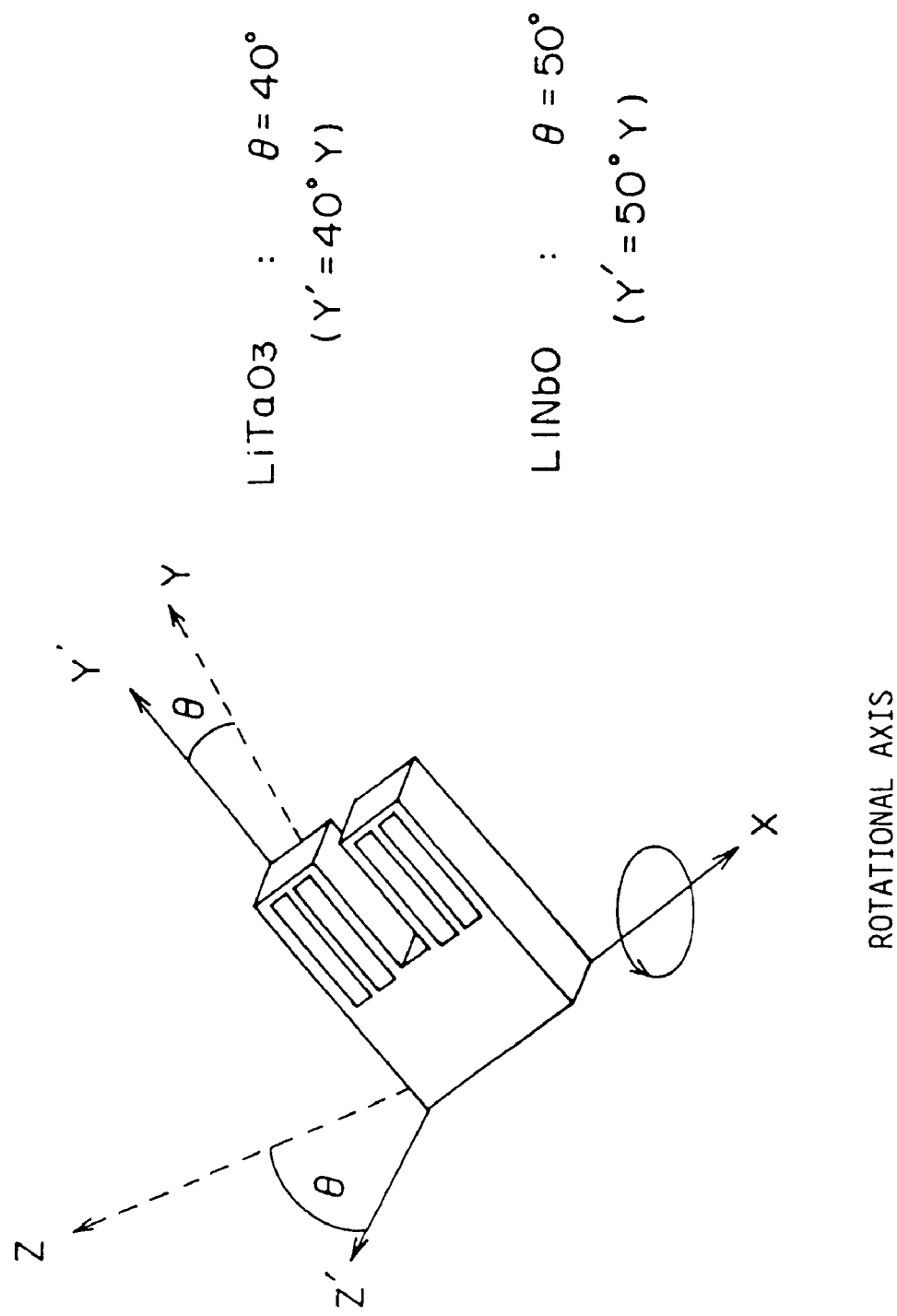
FIG. 23 is a diagram of a crystal orientation of a piezoelectric single crystal.

A description will first be given, with reference to FIGS. 5A through 5D, of the principle of the present invention. A tuning-fork vibratory gyro of the present invention includes arms 20 and 22 and a base 24, which are integrally formed of a single crystal of a piezoelectric substance. It is preferable to use a piezoelectric single crystal having a large piezoelectric transversal effect, such as a trigonal system. An example of such a piezoelectric substance is a $LiTaO_3$ 140°±20° rotation Y plate ($LiTaO_3$ 40°±20° rotation Z plate), a $LiNbO_3$ 130°±20° rotation Y plate ($LiNbO_3$ 50°±20° rotation Z plate), or a quartz X-cut plate. FIG. 23 shows the crystal orientation. The piezoelectric single crystal has a crystal orientation in the thickness direction thereof.

Two drive electrodes 28a and 28b are respectively provided on the front and back surfaces of the base 24, these surfaces being opposite to each other in the thickness direction of the gyro. The drive electrodes 28a and 28b are located in the vicinity of the root portions of the arms 20 and 22 (in the vicinity of the fulcrums). When the gyro is driven by a drive source OSC connected to the drive electrodes 28a and 28b as shown in FIG. 5B, a tuning-fork vibration occurs, as shown in FIGS. 5A and 5C. It is said that the gyro vibrating as described above is in a drive mode. In the drive mode, the upper surface of the base 24 (to which surface the arms 20 and 22 are integrally attached) is vibrated, as indicated by an arrow A shown in FIG. 5A. Such a vibration is due to the transversal effect of the piezoelectric single crystal. The above vibration causes the arms 20 and 22 to be vibrated, as depicted by the broken lines shown in FIG. 5A. If a rotational motion is applied to the vibrating axis in the above drive (vibration) mode, Coriolis force occurs in the direction perpendicular to the vibrating direction. Such Coriolis force can be described by the following equations of motion:

$$Z_x \eta_x = F_x + 2m_y \Omega_0 \eta_y$$

$$Z_y \eta_y = F_y - 2m_x \Omega_0 \eta_x$$

where $Z_x$ and $Z_y$ are respectively mechanical impedances in the x-axis and y-axis directions (see FIG. 5E: the x-axis direction corresponds to the width direction of the gyro, and the y-axis direction corresponds to the thickness direction thereof), $\eta_x$ and $\eta_y$ are respectively speeds in the x-axis and y-axis directions, $F_x$ and $F_y$ are respectively Coriolis forces in the x-axis and y-axis directions, $m_x$ and $m_y$ are respectively masses in the x-axis and y-axis directions, and $\Omega_0$ is the angular velocity.

In the following, an $f_x$-mode vibration is defined as a vibration occurring in the x-axis direction, and an $f_y$-mode vibration is defined as a vibration occurring in the y-axis direction. The vibration shown in FIG. 5C is the $f_x$-mode vibration, and the vibration shown in FIG. 5D is the $f_y$-mode vibration.

If electrodes are provided to the arms 20 and 22 so as to detect the $f_y$-mode vibration, an electric output substantially proportional to the Coriolis force can be obtained from the arms 20 and 22 which are bent in the opposite directions (in antiphase) due to the Coriolis force.

The inventors tried to define an arrangement of the detection electrodes which makes it possible to efficiently detect the above electric output due to only the Coriolis force. Such an arrangement does not sense an unwanted vibration as shown in FIG. 6A in which the arms 20 and 22 vibrate in phase.

Figure 1:
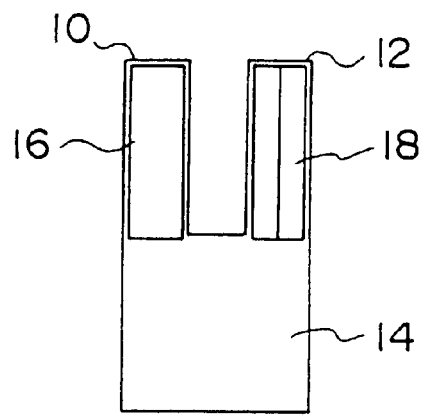
FIG. 1 is a diagram of a conventional tuning-fork vibratory gyro.
Figure 2:
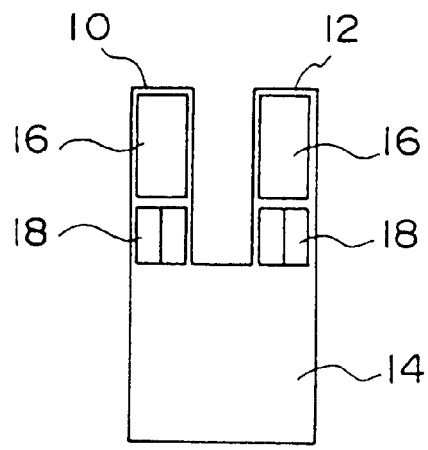
FIG. 2 is a diagram of another conventional tuning-fork vibratory gyro.
Figure 3:
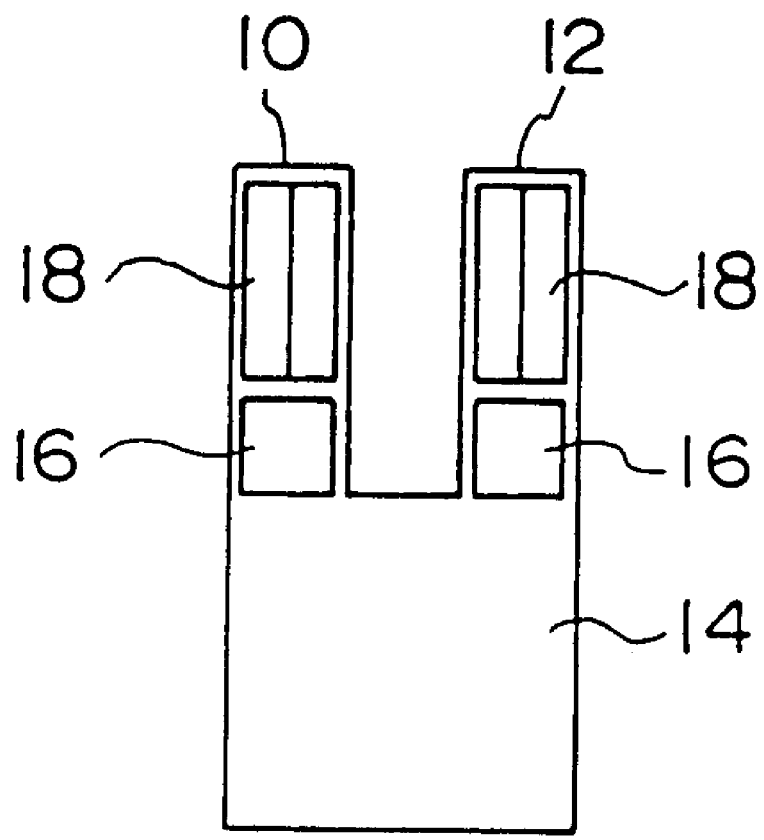
FIG. 3 is a diagram of yet another conventional tuning-fork vibratory gyro.
Figure 6A:
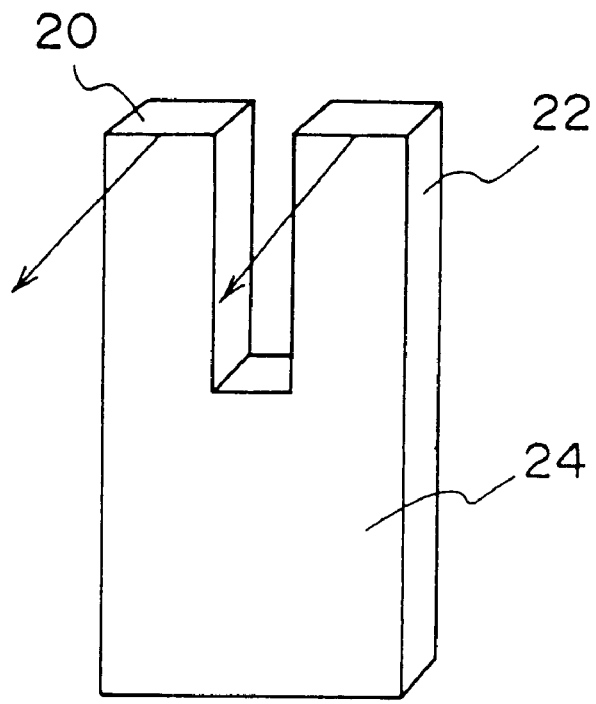
FIGS. 6A and 6B are diagrams showing why an unwanted vibration is not detected by the present invention.
Figure 6B:
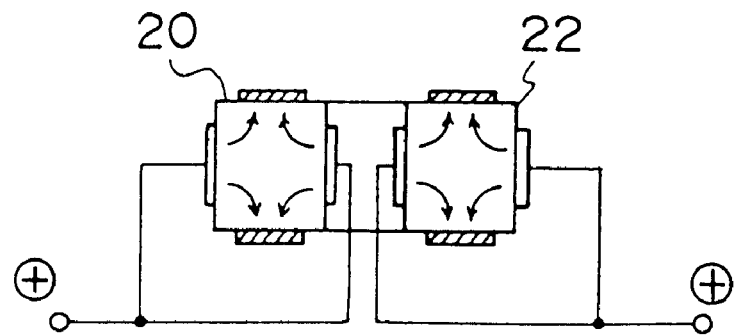

FIG. 6B shows an arrangement of detection electrodes, which are connected as shown therein. Electric fields caused by the unwanted vibration shown in FIG. 6A develop two identical positive potentials. It should be noted that the identical positive potentials can be canceled.

Figure 7A:
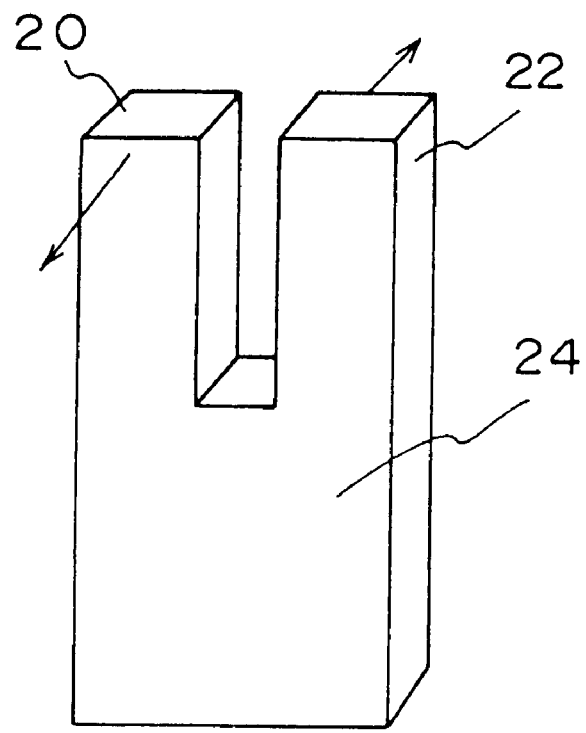
FIGS. 7A and 7B are diagrams of an arrangement of electrodes for detecting an angular velocity.
Figure 7B:
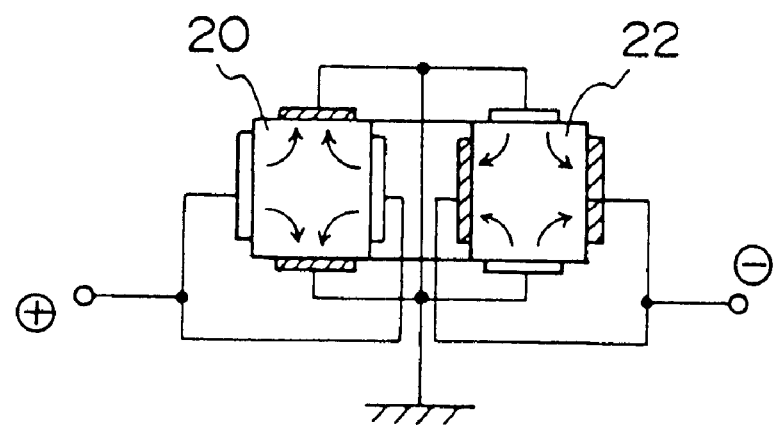

FIG. 7A shows vibrations in the antiphase caused when an angular velocity is applied to the arms 20 and 22 which are in the drive mode. FIG. 7B shows the electric fields caused in the arms 20 and 22 as well as an arrangement of the detection electrodes. In FIG. 7B, two opposite detection electrodes provided on the arm 20 are connected together to form a first detection terminal, and the remaining two opposite detection electrodes provided thereon are grounded. Similarly, two opposite detection electrodes provided on the arm 22 are connected together to form a second detection terminal, and the remaining two opposite detection electrodes provided thereon are grounded.

The above arrangement of the detection electrodes realizes a differential amplification with respect to the vibrations in phase shown in FIG. 6A. Hence, the positive potentials developed by the vibrations shown in FIG. 6A appear at the first and second detection terminals. A positive potential appears at the first terminal connected to the two detection electrodes provided on the arm 20. A negative potential appears at the second terminal connected to the two detection electrodes provided on the arm 22.

Figure 8A:
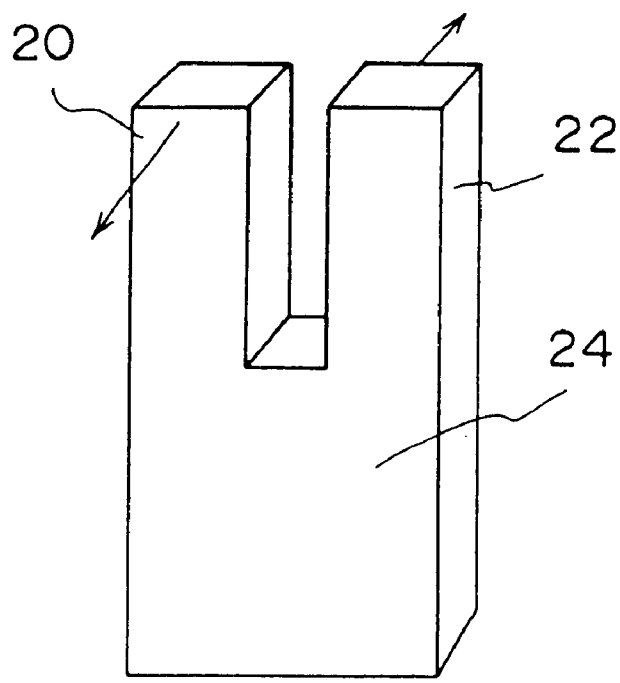
FIGS. 8A and 8B are diagrams of another electrode arrangement for detecting an angular velocity.

FIG. 5B shows another arrangement of the detection electrodes directed to detecting an angular velocity which causes the antiphase vibrations shown in FIG. 8A. The detection electrodes of the arm 20 at which positive potentials are obtained are connected to the detection electrodes of the arm 22 at which positive potentials are obtained, so that a first terminal is formed. Similarly, the detection electrodes of the arm 20 at which negative potentials are obtained are connected to the detection electrodes of the arm 22 at which negative potentials are obtained, so that a second terminal is formed. Hence, the positive potential caused by the vibrations of the arms 20 and 22 is obtained at the first terminal, and the negative potential caused thereby is obtained at the second terminal. The vibrations in phase shown in FIG. 6A can be canceled by the arrangement shown in FIG. 8B and no potentials caused thereby appear at the first and second terminals.

As described above, the present invention utilizes the piezoelectric transversal effect of the piezoelectric single crystal to generate the driving vibrations shown in FIG. 5A, and has the arrangements of the detection electrodes directed to detecting the potentials caused by the angular velocity applied to the arms 20 and 22.

Figure 9A:
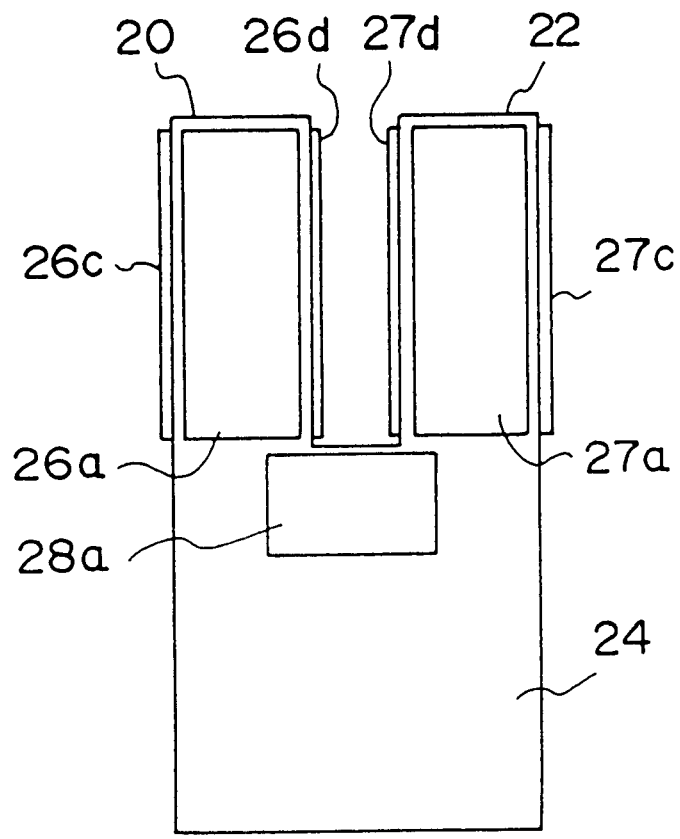
FIGS. 9A and 9B are diagrams of a tuning-fork vibratory gyro according to an embodiment of the present invention.
Figure 9B:
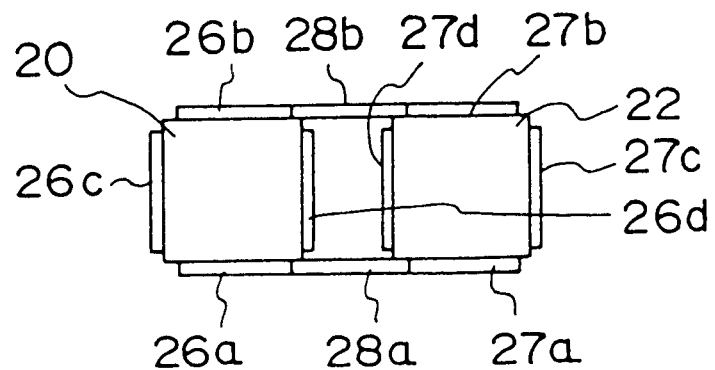

FIGS. 9A and 9B show a gyro according to a first embodiment of the present invention based on the above-mentioned principle. More particularly, FIG. 9A is a front view of the gyro, and FIG. 9B is a plan view thereof. In FIGS. 9A and 9B, parts that are the same as those shown in the previously described figures are given the same reference numbers.

Figure 8B:
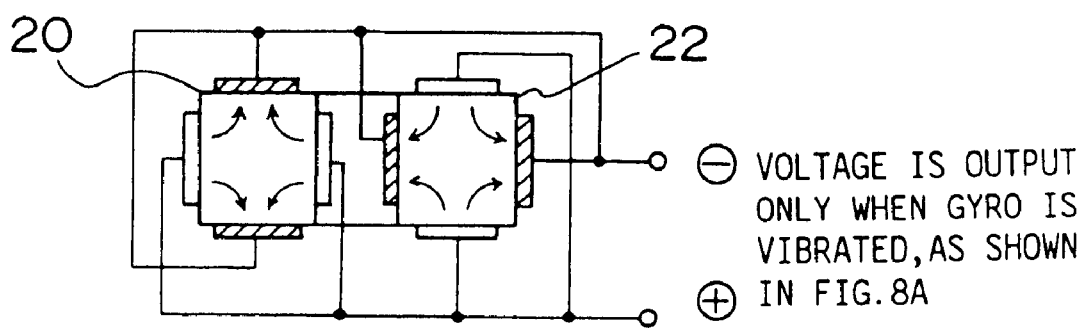

The drive electrodes 28a and 28b are respectively provided on the front and back surfaces of the base 24, and are located in the vicinity of the root portions of the arms 20 and 22, namely, surface portions including the fulcrums of the arms 20 and 22. Four detection electrodes 26a, 26b, 26c and 26d are respectively provided on four side surfaces of the arm 20. Similarly, four detection electrodes 27a, 27b, 27c and 27d are respectively provided on four side surfaces of the arm 22. The detection electrodes 26a through 26d and 27a through 27d are connected as shown in FIG. 7B or FIG. 8B. As will be described later, all of the eight detection electrodes are needed to detect the potentials caused by the antiphase vibrations.

The areas of the drive electrodes 28a and 28b can be selected according to the nature of the gyro element made of a piezoelectric single crystal and comprised of the arms 20 and 22 and the base 24. The capacitance ratio with respect to the drive electrodes 28a and 28b is approximately 478, and the capacitance ratio with respect to the detection electrodes 26a–26d and 27a–27d is approximately 221. It can be said that there is not a large difference in the capacitance ratio between the drive electrodes and the detection electrodes.

A description will now be given, with reference to FIGS. 10A through 10L and FIGS. 11A through 11G, of connections of the detection electrodes and variations of the detection electrodes. FIGS. 10A through 10L are based on the arrangement shown in FIG. 7B, and FIGS. 11A through 11G are based on the arrangement shown in FIG. 8B. For the sake of convenience, the reference numbers indicating the detection electrodes are omitted in FIGS. 10A through 10L and 11A and 11G.

Referring to FIG. 10A, the two detection electrodes opposite to each other in the thickness direction in the arm 20 and the two detection electrodes opposite to each other in the thickness direction in the arm 22 are connected to a reference potential. The remaining two detection electrodes opposite to each other in the width direction in the arm 20 are connected together to form a first terminal. Similarly, the remaining two detection electrodes opposite to each other in the width direction in the arm 22 are connected together to form a second terminal. In FIGS. 10A through 10L and FIGS. 11A through 11G, filled circles denote positive terminals at which a positive potential is output, and circles denote negative terminals at which a negative potential is output.

Referring to FIG. 10B, the two detection electrodes opposite to each other in the width direction in the arm 20 are connected to the two detection electrodes opposite to each other in the width direction in the arm 22, and are further connected to the reference potential. The remaining two electrodes opposite to each other in the thickness direction in the arm 20 are connected together to form a first terminal. The remaining two electrodes opposite to each other in the thickness direction in the arm 22 are connected together to form a second terminal.

Referring to FIG. 10C, the two detection electrodes opposite to each other in the thickness direction in the arm 20 and the two detection electrodes opposite to each other in the thickness direction in the arm 22 are connected together and connected to the reference potential. The detection electrode provided on the outer side surface of the arm 20 located in the width direction functions as a first terminal. The detection electrode provided on the outer side surface of the arm 22 located in the width direction functions as a second terminal.

Referring to FIG. 10D, the two detection electrodes opposite to each other in the thickness direction in the arm 20 and the two detection electrodes opposite to each other in the thickness direction in the arm 22 are connected together and connected to the reference potential. The detection electrode on the inner side surface of the arm 20 located in the width direction functions as a first terminal. The detection electrode provided on the inner side surface of the arm 22 located in the width direction functions as a second terminal.

Referring to FIG. 10E, the two detection electrodes opposite to each other in the thickness direction in the arm 20 are connected together to form a first terminal. The two detection electrodes opposite to each other in the thickness direction in the arm 22 are connected together to form a second terminal. The detection electrode formed on the outer side surface of the arm 20 in the width direction and that formed on the outer side surface of the arm 22 in the width direction are connected to the reference potential.

Referring to FIG. 10F, the two detection electrodes of the arm 20 opposite to each other in the thickness direction and the detection electrode thereof provided on the inner side surface are connected to the reference potential. In FIG. 10F, the above three electrodes are integrally formed. Similarly, the two detection electrodes of the arm 22 opposite to each other in the thickness direction and the detection electrode thereof provided on the inner side surface are connected to the reference potential. The detection electrode of the arm 20 provided on the outer side surface in the width direction functions as a first terminal. The detection electrode of the arm 22 provided on the outer side surface in the width direction functions as a second terminal.

Referring to FIG. 10G, an outer detection electrode provided on the opposite surfaces of the arm 20 in the thickness direction and the outer side surface thereof in the width direction is connected to the reference potential. Similarly, an outer detection electrode provided on the opposite surfaces of the arm 22 in the thickness direction and the outer side surface thereof in the width direction is connected to the reference potential. The inner detection electrode provided on the inner side surface of the arm 20 in the width direction functions as a first terminal. The inner detection electrode provided on the inner side surface of the arm 22 in the width direction functions as a second terminal.

Referring to FIG. 10H, an outer detection electrode provided on the opposite surfaces of the arm 20 in the thickness direction and the outer side surface thereof in the width direction functions as a first terminal. Similarly, an outer detection electrode provided on the opposite surfaces of the arm 22 in the thickness direction and the outer side surface thereof in the width direction functions as a second terminal. The inner detection electrode provided on the inner side surface of the arm 20 in the width direction is connected to the reference potential. Similarly, the inner detection electrode provided on the inner side surface of the arm 22 in the width direction is connected to the reference potential.

Referring to FIG. 10I, a detection electrode provided on the opposite surfaces of the arm 20 in the thickness direction and the inner side surface thereof in the width direction functions as a first terminal. Similarly, a detection electrode provided on the opposite surfaces of the arm 22 in the thickness direction and the inner side surface thereof in the width direction functions as a second terminal. The outer detection electrode provided on the outer side surface of the arm 20 in the width direction is connected to the reference potential. Similarly, the outer detection electrode provided on the outer side surface of the arm 22 in the width direction is connected to the reference potential.

Referring to FIG. 10J, the detection electrode provided on one side (front) surface of the arm 20 in the thickness direction functions as a first terminal. The detection electrode provided on one side (back) surface of the arm 22 in the thickness direction and located on the side opposite to the side on which the above detection electrode of the arm 20 is provided functions as a second terminal. A detection electrode provided on the opposite side surfaces of the arm 20 in the width direction and the other (back) surface in the thickness direction is connected to the reference potential. Similarly, a detection electrode provided on the opposite side surfaces of the arm 22 in the width direction and the other (front) side surface located in the thickness direction is connected to the reference potential.

Referring to FIG. 10K, the detection electrode provided on one surface of the arm 20 in the thickness direction functions as a first terminal. The detection electrode provided on one surface of the arm 22 in the thickness direction and located on the same side as the above detection electrode of the arm 20 functions as a second terminal. The detection electrode provided on the other surface of the arm 20 in the thickness direction and the that provided on the other surface of the arm 22 in the thickness direction are connected to the reference potential.

Referring to FIG. 10L, the two detection electrodes provided on the opposite surfaces of the arm 20 in the thickness direction are connected together and function as a first terminal. Similarly, the two detection electrodes provided on the opposite surfaces of the arm 22 in the thickness direction are connected together and functions as a second terminal. The detection electrode provided on the inner side surface of the arm 20 in the width direction and that provided on the inner side surface of the arm 22 in the width direction are connected to the reference potential.

Referring to FIG. 11A, the two detection electrodes provided on the opposite surfaces of the arm 20 in the thickness direction are connected to the two detection electrodes provided on the opposite side surfaces of the arm 22 in the width direction, and function as a first terminal. The two detection electrodes provided on the opposite side surfaces of the arm 20 in the width direction are connected to the two detection electrodes provided on the opposite surfaces of the arm 22 in the thickness direction, and function as a second terminal.

Referring to FIG. 11B, the two detection electrodes provided on the opposite surfaces of the arm 20 in the thickness direction are connected to the detection electrode provided on the outer side surface of the arm 22 in the width direction, and function as a first terminal. The two detection electrodes provided on the opposite surfaces of the arm 22 in the thickness direction are connected to the detection electrode provided on the outer side surface of the arm 20 in the width direction, and function as a second terminal. In FIG. 11B, no electrodes are provided on the inner side surfaces of the arms 20 and 22 in the width direction.

Referring to FIG. 11C, the two detection electrodes provided on the opposite surfaces of the arm 20 in the thickness direction are connected to the detection electrode provided on the inner side surface of the arm 22 in the width direction, and function as a first terminal. The two detection electrodes provided on the opposite surfaces of the arm 22 in the thickness direction are connected to the detection electrode provided on the inner side surface of the arm 20 in the width direction, and function as a second terminal. In FIG. 11C, no electrodes are provided on the outer side surfaces of the arms 20 and 22 in the width direction.

Referring to FIG. 11D, the two detection electrodes provided on the opposite side surfaces of the arm 20 in the width direction are connected to the detection electrode provided on one surface of the arm 22 in the thickness direction, and function as a first terminal. The two detection electrodes provided on the opposite side surfaces of the arm 22 in the width direction are connected to one side surface of the arm 20 located on the opposite side to the side on which the above detection electrode of the arm 22 is provided, and function as a second terminal.

Referring to FIG 11E, a detection electrode provided on the opposite surfaces of the arm 20 in the thickness direction and the outer side surface thereof in the width direction is connected to the detection electrode provided on the inner side surface of the arm 22 in the width direction, and functions as a first electrode. A detection electrode provided on the opposite surfaces of the arm 22 in the thickness direction and the outer side surface thereof in the width direction is connected to the detection electrode provided on the inner side surface of the arm 20 in the width direction, and functions as a second electrode.

Referring to FIG. 11F, a detection electrode provided on the opposite surfaces of the arm 20 in the thickness direction and the inner side surface thereof in the width direction is connected to the detection electrode provided on the outer side surface of the arm 22 in the width direction, and functions as a first terminal. A detection electrode provided on the opposite surfaces of the arm 22 in the thickness direction and the inner side surface thereof in the width direction is connected to the detection electrode provided on the outer side surface of the arm 20 in the width direction, and functions as a second terminal.

Referring to FIG. 11G, a detection electrode provided on the opposite surfaces of the arm 20 in the thickness direction and the outer side surface thereof in the width direction is connected to the detection electrode provided on the outer side surface of the arm 22 in the width direction, and functions as a first electrode. A detection electrode provided on the opposite surfaces of the arm 22 in the thickness direction and the inner side surface thereof in the width direction is connected to the detection electrode provided on the inner side surface of the arm 20 in the width direction, and functions as a second terminal.

As described above, it is possible to accurately detect the angular velocity by providing the detection electrodes on three or four side surfaces of each of the two arms.

FIGS. 12A through 12D show a tuning-fork vibratory gyro having the electrode arrangement shown in FIG. 11F. The electrodes illustrated in FIGS. 12A through 12D are thicker than the real electrodes for the sake of convenience. More particularly, FIG. 12A is a front view of the gyro, FIG. 12B is a right side view thereof, FIG. 12C is a rear view thereof, and FIG. 12D is a plan view thereof. In these figures, parts that are the same as those in the previously described figures are given the same reference numbers.

The detection electrodes 26a, 26b and 26d are integrally formed so as to form a single detection electrode. A lead line 31 connects the above single detection electrode to a terminal 33 for external connection formed on the front surface of the base 24. Similarly, the detection electrodes 27a, 27b and 27d are integrally formed so as to form a single detection electrode. A lead line 32 connects the above single detection electrode to a terminal 34 for external connection formed on the front surface of the base 24. The detection electrode 26c is connected to a terminal 37 for external connection formed on the base 24 by a lead line 35. Similarly, the detection electrode 27c is connected to a terminal 38 for external connection formed on the base 24 by a lead line 36. The drive electrode 28a formed on the front surface of the base 24 is connected to a terminal 39 for external connection by a lead line 40. The drive electrode 28b formed on the back surface of the base 24 is connected to a terminal 41 for external connection by a lead line 42, which extends on the back surface and passes through a through hole 43 formed in the base 24. Then, the lead line 42 extends on the front surface of the base 24 and is connected to the terminal 41 formed thereon.

Figure 13A:
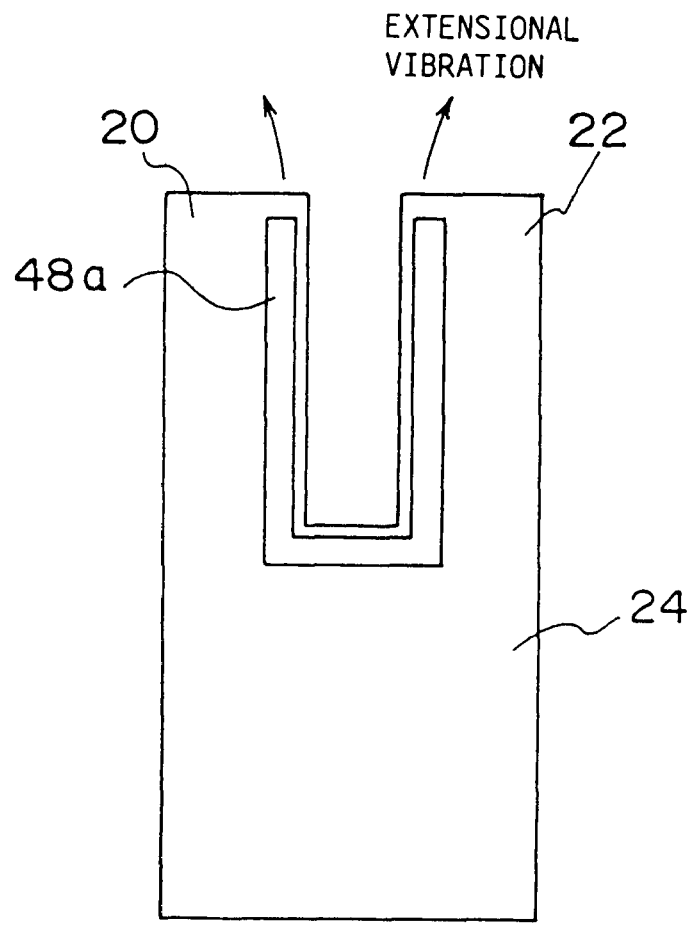
FIGS. 13A and 13B are diagrams of another arrangement of drive electrodes.
Figure 13B:
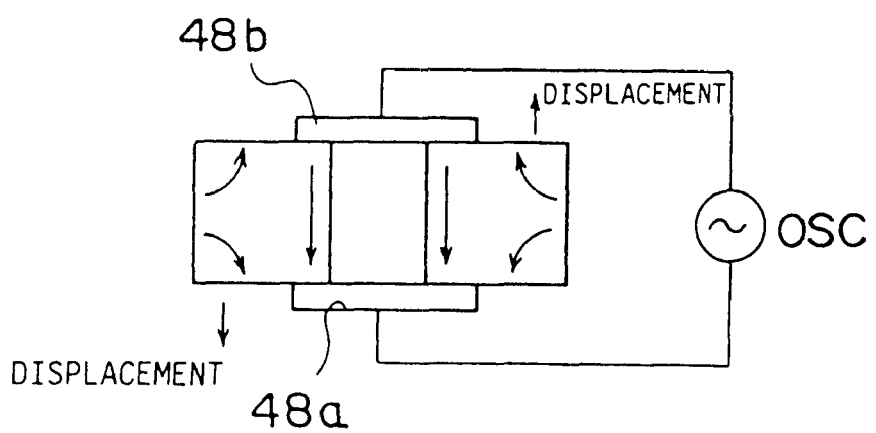

A description will now be given of another electrode arrangement by referring to FIGS. 13A and 13B, in which parts that are the same as those shown in the previously described figures are given the same reference numbers. The electrode arrangement described below has drive electrodes each having portions provided on the front and back surfaces of the arms 20 and 22. FIG. 13A is a front view of a gyro having such an electrode arrangement, and FIG. 13B is a plan view thereof. These figures are used to describe the principle of the following electrode arrangement.

A substantially U-shaped drive electrode 48a is provided on the front surface of the gyro so that it is provided on the inner portion of the front surface of the arms 20 and 22 and a front surface portion of the base 24 close to the roots of the arms 20 and 22. Similarly, a substantially U-shaped drive electrode 48b is provided on the back surface of the gyro so that it is provided on the inner portions of the back surfaces of the arms 20 and 22 and a back surface portion of the base 24 close to the roots of the arms 20 and 22. When the gyro is driven via the drive electrodes 48a and 48b, a vibration as shown in FIG. 5A is caused due to the piezoelectric transversal effect, which acts on not only the base 24 but also the inner portions of the arms 20 and 22.

More particularly, as shown in FIG. 13B, when a drive source OSC is connected to the drive electrodes 48a and 48b and a drive signal generated thereby is applied across the electrodes 48a and 48b, electric fields are caused in the arms 20 and 22, as indicated by straight arrows. The electric fields cause the tuning-fork vibrations as shown in FIG. 5A. If an angular velocity is applied to the gyro which is in the drive mode, the arms 20 and 22 are displaced in the antiphase as shown in FIG. 5D or FIG. 5E, so that electric fields are generated in the arms 20 and 22, as shown by curved arrows in FIG. 13B. The angular velocity can be detected by detecting the potentials caused by the electric fields. The detection electrodes directed to detecting the above potentials can be provided on outer portions of the front and back surfaces of the arms 20 and 22, as will be described below.

Figures 14A, 14B:
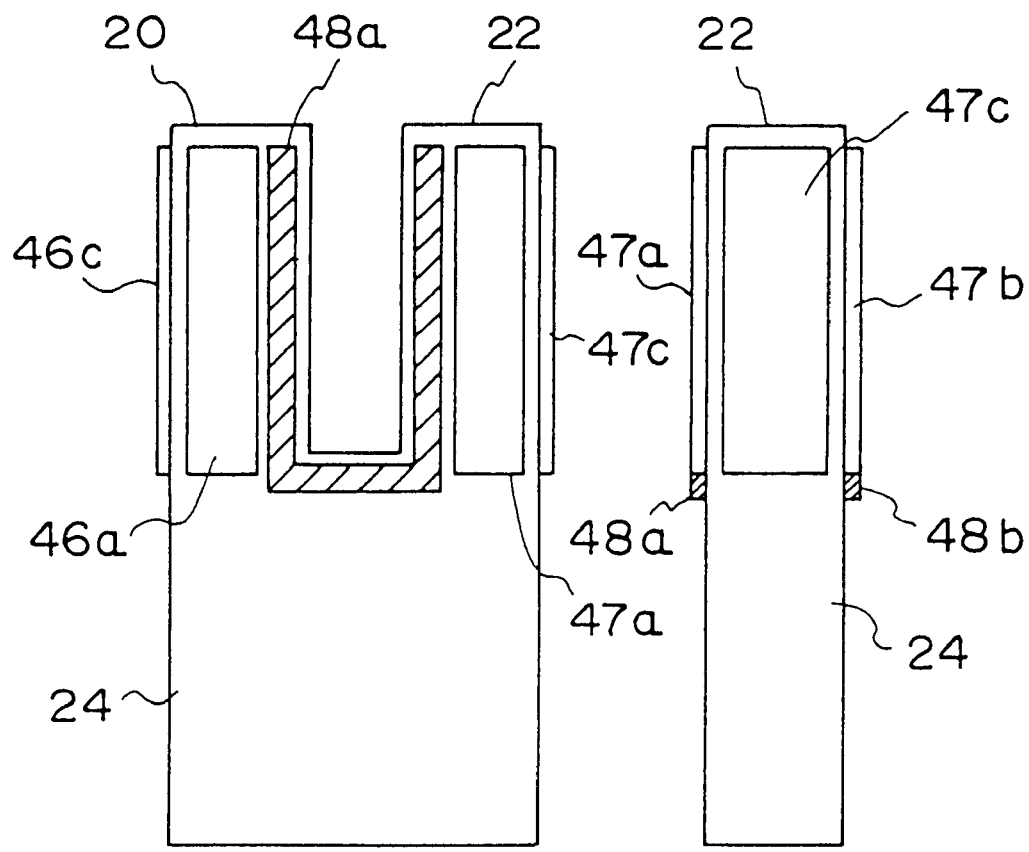
FIGS. 14A, 14B and 14C are diagrams of a tuning-fork vibratory gyro having the electrode arrangement shown in FIGS. 13A and 13B.
Figure 14C:
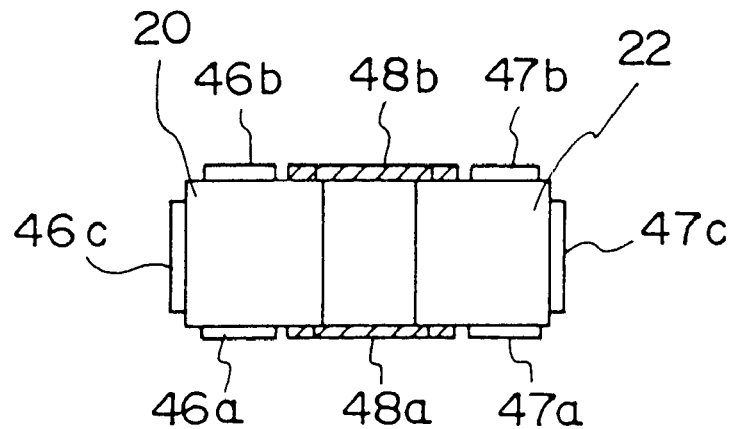

FIGS. 14A, 14B and 14C show a gyro in which detection electrodes are illustrated in addition to the drive electrodes 48a and 48b. More particularly, FIG. 14A is a front view of the gyro, FIG. 14B is a right side view thereof, and FIG. 14C is a plan view thereof. Three detection electrodes 46a, 46b and 46c are provided to the arm 20. The detection electrode 46a is provided on the front surface of the arm 20 so that the electrodes 46a and 48a are arranged side by side. The detection electrode 46b is provided on the back surface of the arm 20 so that the electrodes 46b and 48b are arranged side by side. The detection electrode 46c is provided on the outer side surface of the arm 20 in the width direction. The detection electrodes 46a and 46b are located on the front and back outer surface portions of the arm 20.

Similarly, three detection electrodes 47a, 47b and 47c are provided to the arm 22. The detection electrode 47a is provided on the front surface of the arm 22 so that the electrodes 47a and 48a are arranged side by side. The detection electrode 47b is provided on the back surface of the arm so that the electrodes 47b and 48b are arranged side by side. The detection electrode 47c is provided on the outer side surface of the arm 22 in the width direction. The detection electrodes 47a and 47b are located on the outer portions of the front and back surfaces of the arm 22. It should be noted that lead lines and terminals as have been described with reference to FIGS. 12A–12C are omitted in FIGS. 14A–14C for the sake of simplicity.

The capacitance ratio with respect to the drive electrodes 48a and 48b is approximately 136, and the capacitance ratio with respect to the detection electrodes 46a–46c and 47a–47c is approximately 278. Thus, there is a small difference in the capacitance ratio between the drive electrodes and the detection electrodes.

Figure 15A:
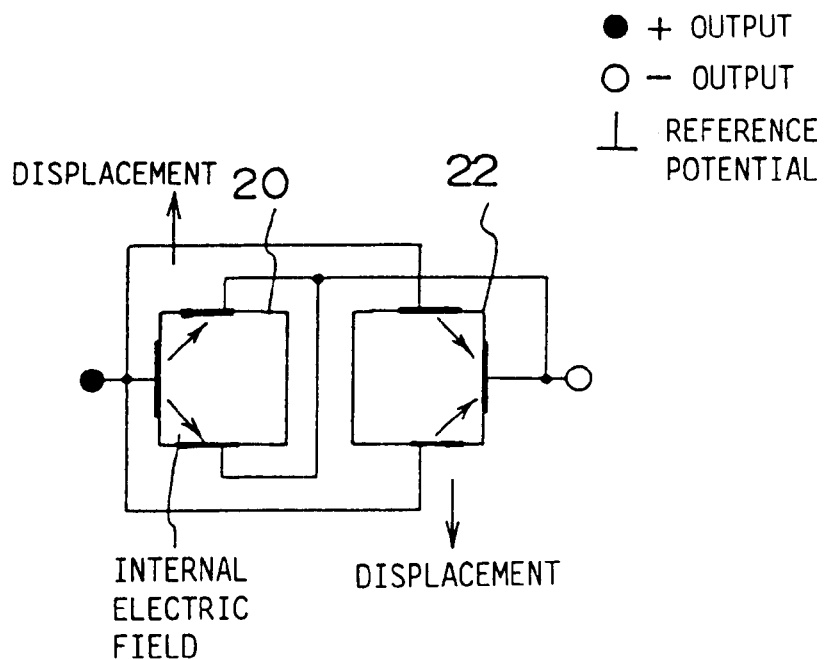
FIGS. 15A, 15B and 15C are diagrams of arrangements of the electrodes shown in FIGS. 14A, 14B and 14C and connections thereof.
Figure 15B:
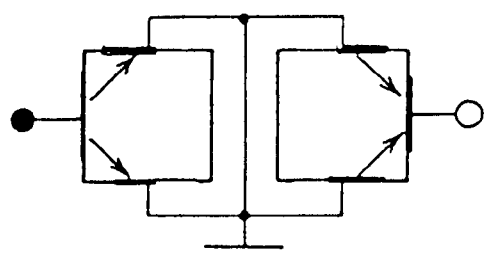
Figure 15C:
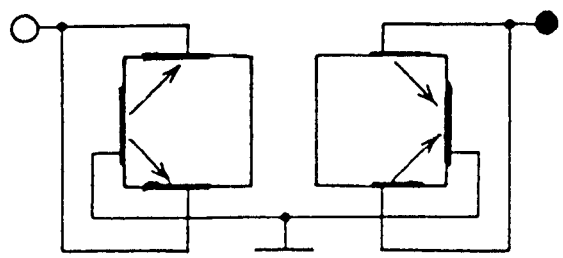

FIGS. 15A, 15B and 15C respectively show connections of the detection electrodes of the gyro shown in FIGS. 14A–14C. The connection of the detection electrodes shown in FIG. 15A is directed to having two terminals across which the potential difference develops. The connections of the detection electrodes shown in FIGS. 15B and 15C are directed to having three terminals including one terminal connected to the reference potential.

Referring to FIG. 15A, the detection electrodes provided on the two opposite surfaces of the arm 20 in the thickness direction are connected to the detection electrode provided on the outer side surface of the arm 22 in the width direction, and form a first terminal. The detection electrodes provided on the two opposite surfaces of the arm 22 in the thickness direction are connected to the detection electrode provided on the outer side surface of the arm 20 in the width direction, and form a second terminal.

Referring to FIG. 15B, the detection electrodes provided on the two opposite surfaces of the arm 20 in the thickness direction are connected to the reference potential. The detection electrodes provided on the two opposite surfaces of the arm 22 in the thickness direction are connected to the reference potential. The detection electrode provided on the outer side surface of the arm 20 in the width direction forms a first terminal. The detection electrode provided on the outer side surface of the arm 22 in the width direction forms a second terminal.

Referring to FIG. 15C, the detection electrodes provided on the two opposite surfaces of the arm 20 in the thickness direction form a first terminal. The detection electrodes provided on the two opposite surfaces of the arm 22 in the thickness direction form a second terminal. The detection electrode provided on the outer side surface of the arm 20 in the width direction is connected to the reference potential. The detection electrode provided on the outer side surface of the arm 22 in the width direction is connected to the reference potential.

FIGS. 16A, 16B, 16C and 16D show a variation of the gyro shown in FIGS. 14A through 14C. In FIGS. 16A–16D, parts that are the same as those shown in the previously described figures are given the same reference numbers. Drive electrodes 58a and 58b are respectively provided on the front and back surfaces of the gyro in the thickness direction. The drive electrode 58a has a portion provided on the inner portion of the front surface of the arm 20, and another portion provided on the inner portion of the front surface of the arm 22. Also, the drive electrode 58a has a portion 58a' provided on a front surface portion of the base 24 and located in the vicinity of the roots of the arms 20 and 22. Similarly, the drive electrode 58b has a portion provided on the inner portion of the back surface of the arm 20, and another portion on the inner portion of the back surface of the arm 22. Also, the drive electrode 58b has a portion 58b' provided on a back surface portion of the base 24 and located in the vicinity of the roots of the arms 20 and 22. When a drive signal is applied across the drive electrodes 58a and 58b, the tune-fork vibrations shown in FIG. 5A are caused in the arms 20 and 22. In this case, the piezoelectric transversal effect acts on not only the base 24 but also the inner surface portions of the arms 20 and 22.

The drive electrode 58a is connected, by a lead line 61, to a terminal 60 for external connection formed on the front surface of the base 24. The drive electrode 58b is connected, by a lead line 68, to a terminal 67 for external connection formed on the front surface of the base 24. The lead line 68 extends on the back surface of the base 24 and passes through a through hole 66 formed in the base 24. Then, the lead line 68 extends on the front surface of the base 24 and is connected to the terminal 67.

Three detection electrodes 56a, 56b and 56c are provided on the arm 20, and three detection electrodes 57a, 57b and 57c are provided on the arm 22. The detection electrodes 56a and 56b are respectively provided on the outer surface portions of the front and back surfaces of the arm 20. The detection electrode 56c is provided on the outer side surface of the arm 20 in the width direction. The detection electrodes 57a and 57b are respectively provided on the outer portions of the front and back surfaces of the arm 22. The detection electrode 57c is provided on the outer side surface of the arm 22 in the width direction. The above detection electrodes 56a–56c and 57a–57c are connected, as shown in FIG. 15A.

The detection electrode 56a is connected to a terminal 62 for external connection formed on the front surface of the base 24 by a lead line 63. The detection electrode 56b is connected to the lead line 63 by a lead line 70 passing through a through hole 69. The detection electrode 56c is connected to a terminal 73 for external connection formed on the front surface of the base 24 by a lead line 74. Similarly, the detection electrode 57a is connected to a terminal 64 for external connection by a lead line 65. The detection electrode 57b is connected to the lead line 65 by a lead line 72 passing through a through hole 71. The detection electrode 57c is connected to a terminal 75 for external connection formed on the front surface of the base 24 by a lead line 76.

A description will now be given of other electrode arrangements which correspond to modifications of those shown in FIGS. 14A–14C and 16A–16D. In the modifications, the drive electrodes are provided on outer portions of the front and back surfaces of the arms, and the detection electrodes are provided on inner portions of the front and back surfaces of the arms and the inner side surfaces thereof in the width direction. The modifications can cause the tuning-fork vibrations due to the piezoelectric transversal effect.

Figure 17A:
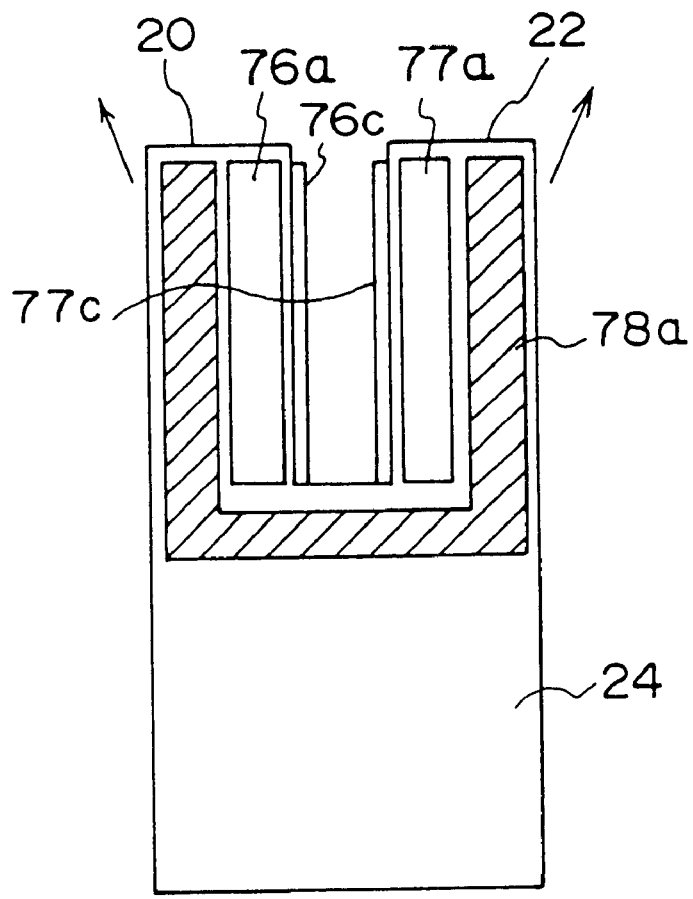
FIGS. 17A and 17B are diagrams of the principle of yet another arrangement of the drive electrodes.
Figure 17B:
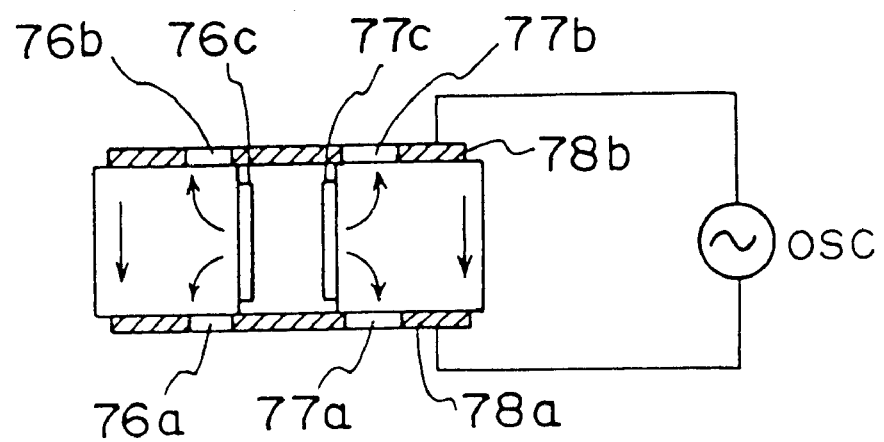

FIGS. 17A and 17B show one example of such modifications. Drive electrodes 78a and 78b are respectively provided on the front and back surface portions of the arms 20 and 22. The drive electrode 78a has a portion located on the outer portion of the front surface of the arm 20 and a portion located on the outer portion of the front surface of the arm 22. Further, the drive electrode 78a has a portion provided on the front surface of the base 24 and located in the vicinity of the roots of the arms 20 and 22. The drive electrode 78b has a portion located on the outer portion of the back surface of the arm 20 and a portion located on the outer portion of the back surface of the arm 22. Further, the drive electrode 78b has a portion provided on the back surface of the base 24 and located in the vicinity of the roots of the arms 20 and 22.

When a drive source OSC is connected across he drive electrodes 78a and 78b as shown in FIG. 17B, electric fields are generated in the arms 20 and 22, as indicated by straight arrows. Hence, the arms 20 and 22 are bent, as shown in FIG. 5A, so that the tuning-fork vibrations can be caused. If an angular velocity is applied to the gyro which is in the drive mode, the arms 20 and 22 are displaced in the antiphase as shown in FIG. 5D or 5E, so that the electric fields are generated in the arms 20 and 22, as shown by curved arrows in FIG. 17B. The angular velocity can be detected by detecting the potentials caused by the electric fields.

A detection electrode 76a is provided on the inner portion of the front surface of the arm 20, and a detection electrode 76b is provided on the inner portion of the back surface thereof. A detection electrode 76c is provided on the inner side surface of the arm 20. A detection electrode 77a is provided on the inner portion of the front surface of the arm 22, and a detection electrode 77b is provided on the inner portion of the back surface thereof. A detection electrode 77c is provided in the inner side surface of the arm 22.

Figure 18A:
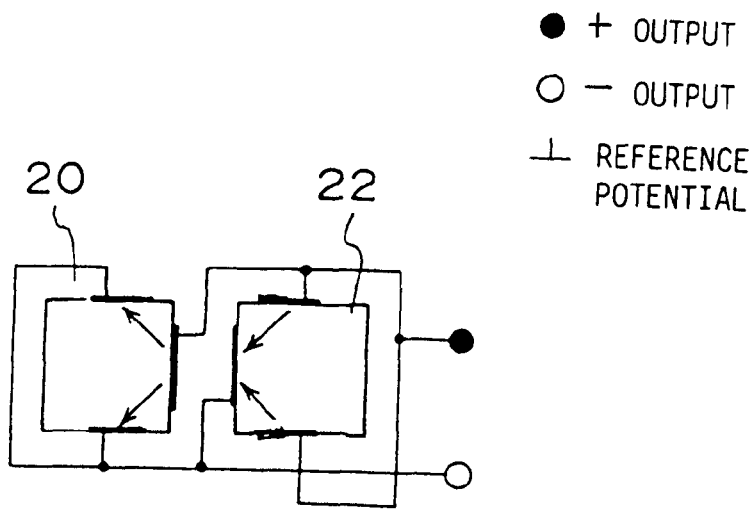
FIGS. 18A, 18B and 18C are diagrams of arrangements o the electrodes and connections thereof.
Figure 18B:
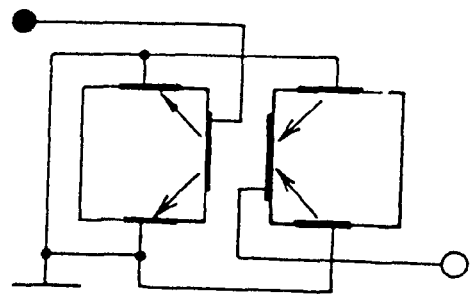
Figure 18C:
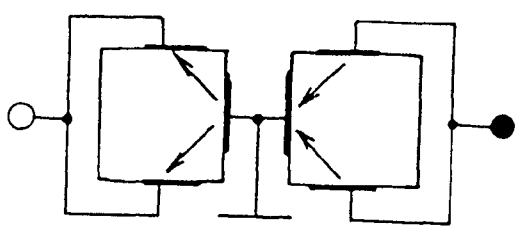

FIGS. 18A, 18B and 18C respectively show connections of the detection electrodes of the gyro shown in FIGS. 17A and 17B. The connection of the detection electrodes shown in FIG. 18A is directed to having two terminals across which the potential difference develops. The connections of the detection electrodes shown in FIGS. 18B and 18C are directed to having three terminals including one terminal connected to the reference potential.

Referring to FIG. 18A, the detection electrodes respectively provided on the front and back surfaces of the arm 20 are connected to the detection electrode provided in the inner side surface of the arm 22, and function as a first terminal. The detection electrodes respectively provided on the front and back surfaces of the arm 22 are connected to the detection electrode provided in the inner side surface of the arm 20, and function as a second terminal.

Referring to FIG. 18B, the detection electrodes respectively provided on the front and back surfaces of the arm 20 are connected to the reference potential. The detection electrodes respectively provided on the front and back surfaces of the arm 22 are connected to the reference potential. The detection electrode provided in the inner side surface of the arm 20 functions as a first terminal. The detection electrode provided in the inner side surface of the arm 22 functions as a second terminal.

Referring to FIG. 18C, the detection electrodes respectively provided on the front and back surfaces of the arm 20 form a first terminal. The detection electrodes respectively provided on the front and back surfaces of the arm 22 form a second terminal. The detection electrode provided on the inner side surface of the arm 20 and that provided on the inner side surface of the arm 22 are connected to the reference potential.

Figure 19A:
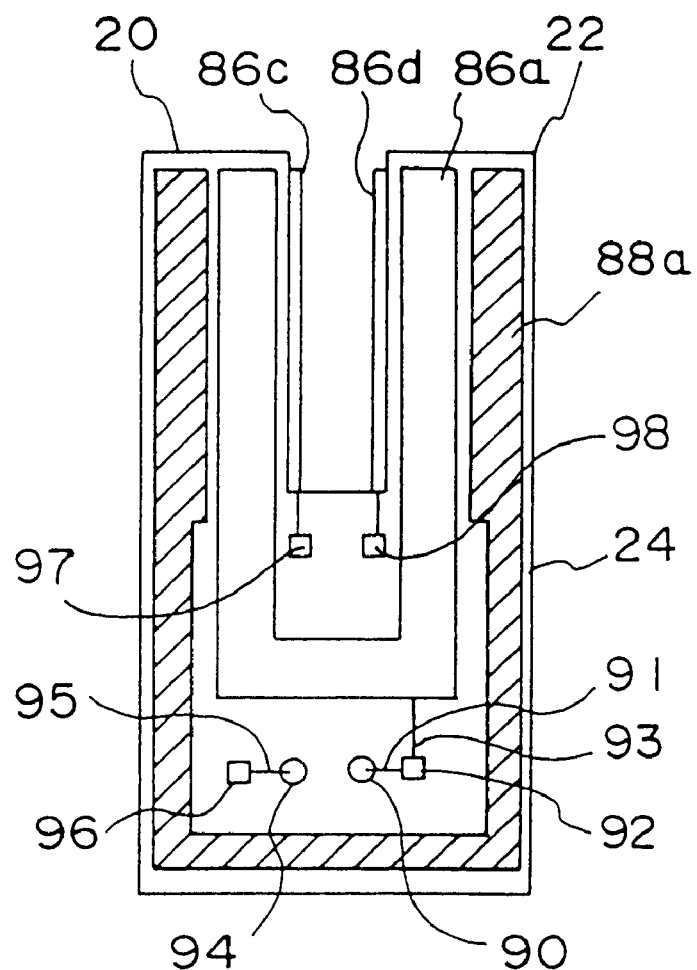
FIGS. 19A and 19B are diagrams of a tuning-fork vibratory gyro based on the structure shown in FIGS. 17A and 17B.
Figure 19B:
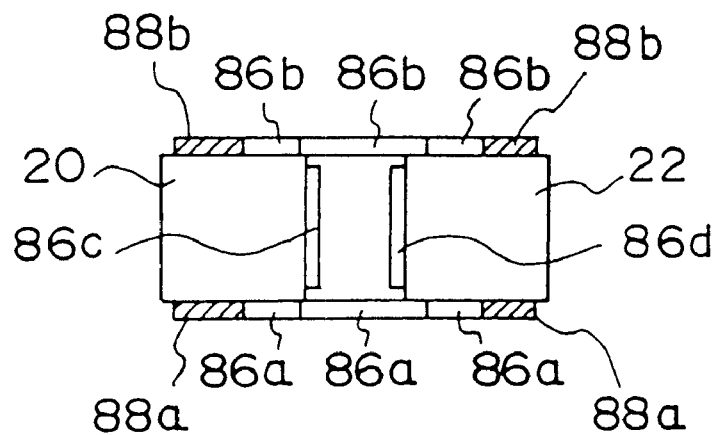

FIGS. 19A and 19B show a tuning-fork vibratory gyro having the electrode arrangement shown in FIG. 18B. In FIGS. 19A and 19B, parts that are the same as those shown in the previously described figures are given the same reference numbers. FIG. 19A is a front view of the gyro, and FIG. 19B is a plan view thereof. Drive electrodes 88a and 88b are respectively provided on the front and back surfaces of the gyro. The drive electrode 88b is connected, by a lead line 95, to a terminal 96 for external connection formed on the front surface of the gyro. The lead line 95 passes through a through hole 94 formed in the gyro. The drive electrode 88a extends on the front surface of the gyro along the outer edges thereof. Similarly, the drive electrode 88b extends on the back surface of the gyro along the outer edges thereof.

A detection electrode 86a is formed on the front surface of the gyro so that the detection electrode 86a and the drive electrode 88a are arranged side by side on the front surfaces of the arms 20 and 22. Further, the detection electrode 86a has a portion provided on the base 24 of the gyro. The detection electrode 86a is connected to a terminal 92 for external connection formed on the base 24 by a lead line 93. Similarly, a detection electrode 86b is formed on the back surface of the gyro, and is connected to the terminal 92 by a lead line 91 passing through a through hole 90 formed in the base 24. Further, a detection electrode 86c is provided on the inner side surface of the arm 20 in the width direction, and a detection electrode 86d is provided on the inner side surface of the arm 22 in the width direction. The detection electrodes 86c and 86d are respectively connected to terminals 97 and 98 formed on the base 24.

Figure 20:
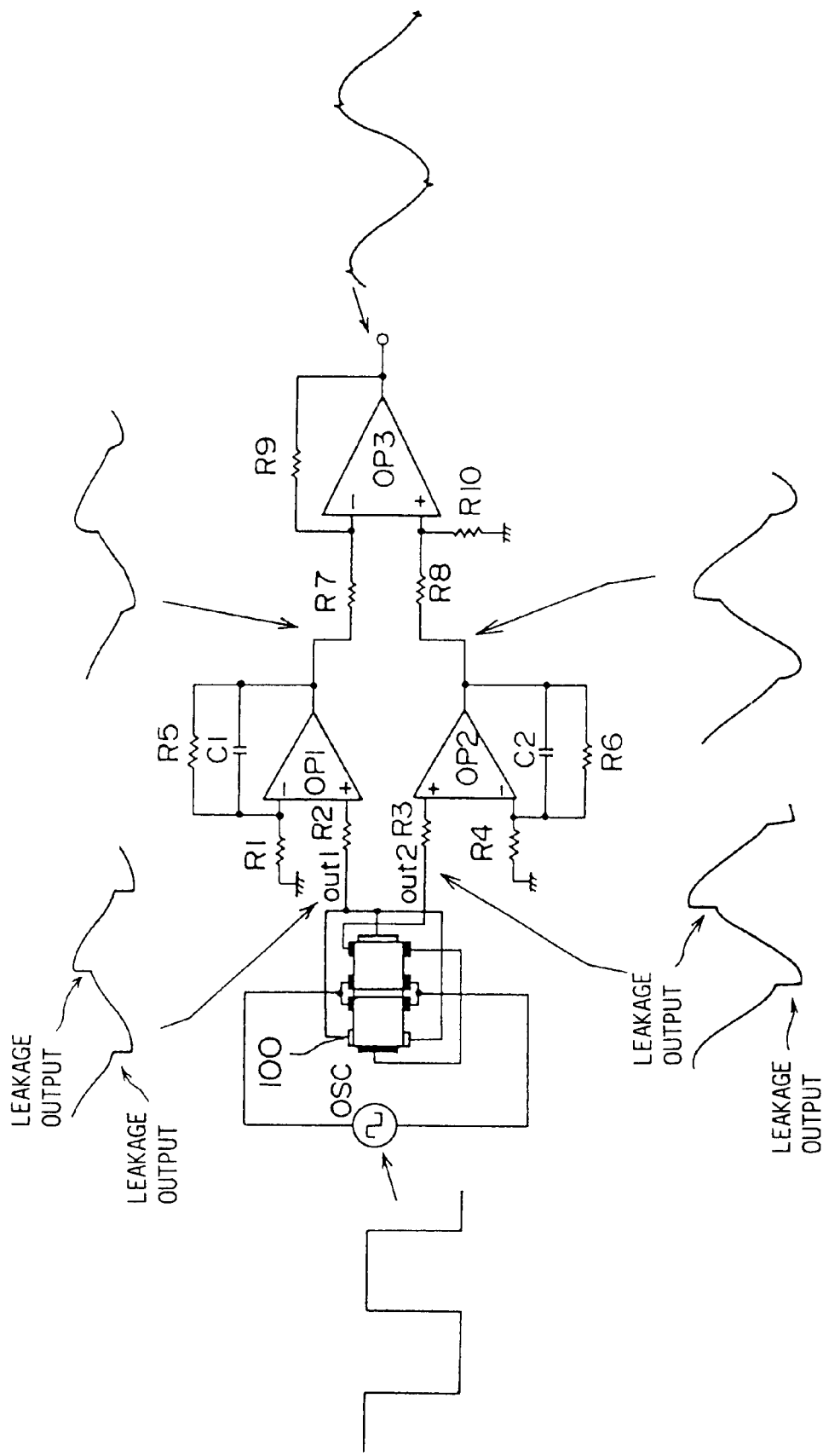
FIG. 20 is a diagram of a structure of a detection circuit which can be used in the present invention and an operation of the detection circuit.

FIG. 20 show a detection circuit which detects the output voltage of the tuning-fork vibratory gyro of the present invention. A reference number 100 indicates the tuning-fork vibratory gyro of the present invention. The detection circuit includes operational amplifiers OP1, OP2 and OP3, resistors R1–R10 and capacitors C1–C2. The gyro 100 has outputs out1 and out2, which are connected to non-inverting input terminals of the operational amplifiers OP1 and OP2 via the resistors R2 and R3, respectively. The output terminal of the operational amplifier OP3 functions as an output terminal of the detection circuit.

When a rectangular wave generated by the oscillator OSC is applied to the gyro 100, the waveform of the output voltage includes a leakage output component due to the electrostatic coupling. The operational amplifiers OP1 and OP2 amplify the output signals out1 and out2 of the gyro 100, respectively. The operational amplifier OP3 performs a differential amplifying operation on the output signals of the operational amplifiers OP1 and OP2. As can be seen from the waveform of the output signal of the operational amplifier OP3 shown in FIG. 20, the leakage output component can be substantially eliminated (canceled) due to the differential amplification.

According to the above-mentioned tuning-fork vibratory gyro of the present invention, it is possible to accurately detect the angular velocity without being affected by the unwanted vibrations. In addition, the routing of lead lines is simple, so that the present invention gyro is suitable for mass production.

A description will now be given of further improvements in the above-mentioned electrode arrangements.

Figure 22A:
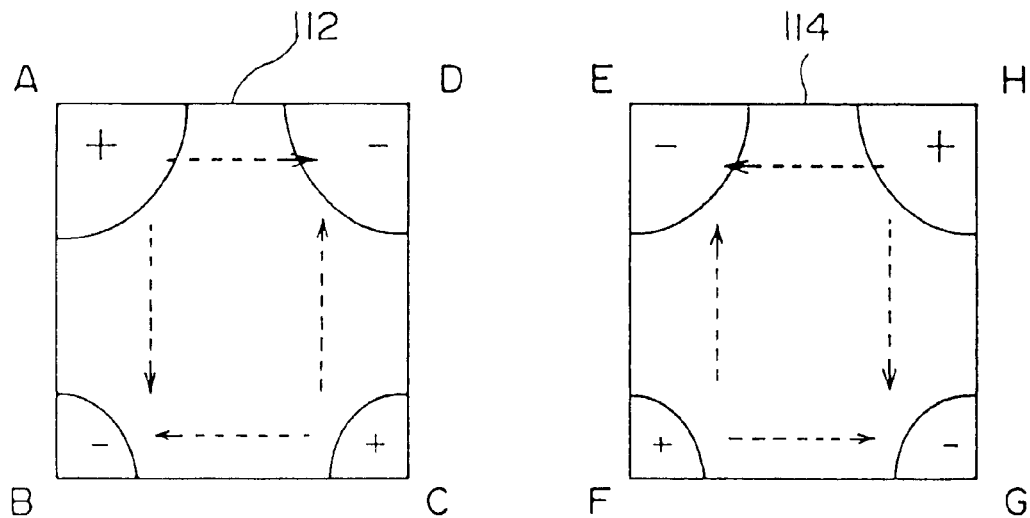
FIGS. 22A and 22B are diagrams of distributions of charges stored in two arms of the gyro.
Figure 22B:
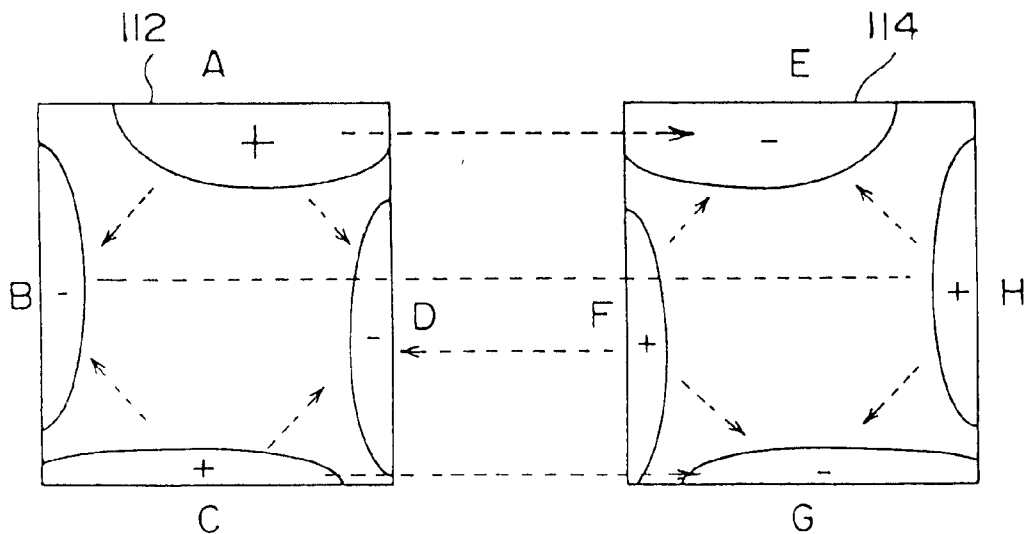

In the above-mentioned electrode arrangements, three or four electrodes are provided for each of the two arms 20 and 22. The inventors studied a reduction in the number of electrodes per arm, and attempted to provide a tuning-fork vibratory gyro which is simpler and much more suitable for mass production than the above-mentioned gyro. The inventors considered the mechanism of the tuning-fork vibratory gyro shown in FIGS. 21A through 21D, and paid attention to the difference between the distributions of charges obtained in the drive mode and those obtained in the detection mode, as shown in FIGS. 22A and 22B. It should be noted that the following description includes some explanation which has been given in order to facilitate understanding of the further improved electrode arrangements.

FIGS. 21A and 21C show a tuning-fork vibratory gyro of a piezoelectric type, in which only a gyro element made of a piezoelectric substance is illustrated and electrodes to be formed thereon are omitted. A tuning-fork vibratory gyro 110 includes two arms 112 and 114, and a base 116 integrally formed with the arms 112 and 114.

FIG. 21B shows a gyro obtained by providing electrodes 131, 132, 137 and 138 to the gyro element shown in FIGS. 21A and 21C. If a drive voltage is applied across the electrodes 131 and 132 and across the electrodes 137 and 138, electric fields are respectively generated in the arms 112 and 114, as indicated by arrows in FIG. 21B. The electric fields cause the arms 112 and 114 to be vibrated due to the piezoelectric transversal effect, as indicated by arrows shown in FIGS. 21A and 21B. The vibrations shown in FIGS. 21A and 21B are $f_x$-mode vibrations.

If an angular velocity is applied to the gyro which is in the $f_x$ mode, the Coriolis forces occur, as defined by the aforementioned equations of motions. Then, as shown in FIG. 21D, the arms 112 and 114 are vibrated in the direction perpendicular to the direction in which the arms 112 and 114 are vibrated in the $f_x$ mode. That is, the vibrations shown in FIG. 21D are $f_y$-mode vibrations. As shown in FIG. 21D, if electrodes 133, 134, 135 and 136 are provided to the gyro element, electric outputs can be obtained from the arms 112 and 114, which are bent in the antiphase.

FIG. 22A shows the distributions of charges in the arms 112 and 114 which are in the $f_x$ mode. FIG. 22B shows the distributions of charges in the arms 112 and 114 which are in the $f_y$ mode. The inventors paid attention to the difference between the charge distributions shown in FIG. 22A and the charge distributions shown in FIG. 22B and found that the potentials proportional to the angular velocity can be detected by only two electrodes for each of the two arms.

In FIGS. 22A and 22B, symbols A–D indicate charge distributions generated in the arm 112 and the potentials thereof, and symbols E–H indicate charge distributions generated in the arm 114 and the potentials thereof. Further, symbols "+" and "−" denote the polarities of the charges. The arrows denote electric fields.

More particularly, the charge distributions shown in FIG. 22A are obtained by driving the tuning-fork vibrations using the electrode arrangement shown in FIG. 21B. The charge distributions shown in FIG. 22B are obtained when Coriolis forces due to an angular velocity are generated in the gyro that is in the state shown in FIG. 21A. The inventors found that the positions of charges generated, the polarities of the charges and the amounts of charges obtained in the $f_x$ mode differ from those in the $f_y$ mode due to the anisotropy of the crystal. Taking into consideration the above, the inventors concluded that detection electrodes should be located in a first position in which the largest amount of positive charge or a relatively large amount of positive charge can be obtained in the $f_y$ mode and in a second position in which the largest amount of negative charge or a relatively small amount of negative charge can be obtained in the $f_y$ mode. Hence, the potential difference proportional to the angular velocity can be obtained across the detection electrodes provided in the first and second positions.

More particularly, the detection electrodes are provided so as to detect the potential difference between the charge distribution A and the charge distribution E. More strictly, one detection electrode is provided on the inner portion of the upper surface of the arm 112, and the other detection electrode is provided on the inner portion of the upper surface of the arm 114. For the sake of convenience, the surfaces of the arms 112 and 114 on which the charge distributions A and E are respectively obtained are referred to as upper surfaces, and the surfaces of the arms 112 and 114 on which the charge distributions C and G are respectively obtained are referred to as lower surfaces. The above arrangement of the two detection electrodes corresponds to that shown in FIG. 21D. In principle, it is possible to detect the potential difference caused by the Coriolis forces by the above two detection electrodes. However, it is preferable to provide two detection electrodes on the lower surfaces of the arms 112 and 114, as shown in FIG. 21D and thereby improve the sensitivity.

In FIG. 22A, the potentials A–H have the following relationship in magnitude:

$$A=-D=-E=H>-B=C=F=-G.$$

In FIG. 22B, the potentials A–H have the following relationship in magnitude:

$$A=-E>-B=-D=F=H>C=G.$$

It can be seen from FIGS. 22A and 22B that other arrangements of detection electrodes can be employed to detect the potential difference caused by the Coriolis forces. For example, the potential difference can be detected by detection electrodes provided on outer surface portions of the arms, as shown in FIG. 21B. For example, one detection electrode can be provided on the outer portion of the upper surface of the arm 112 to detect the charge distribution A, and the other detection electrode can be provided on the outer portion of the upper surface of the arm 114 to detect the charge distribution E. However, the above electrode arrangement has a sensitivity lower than the electrode arrangement shown in FIG. 21D.

Figure 24:
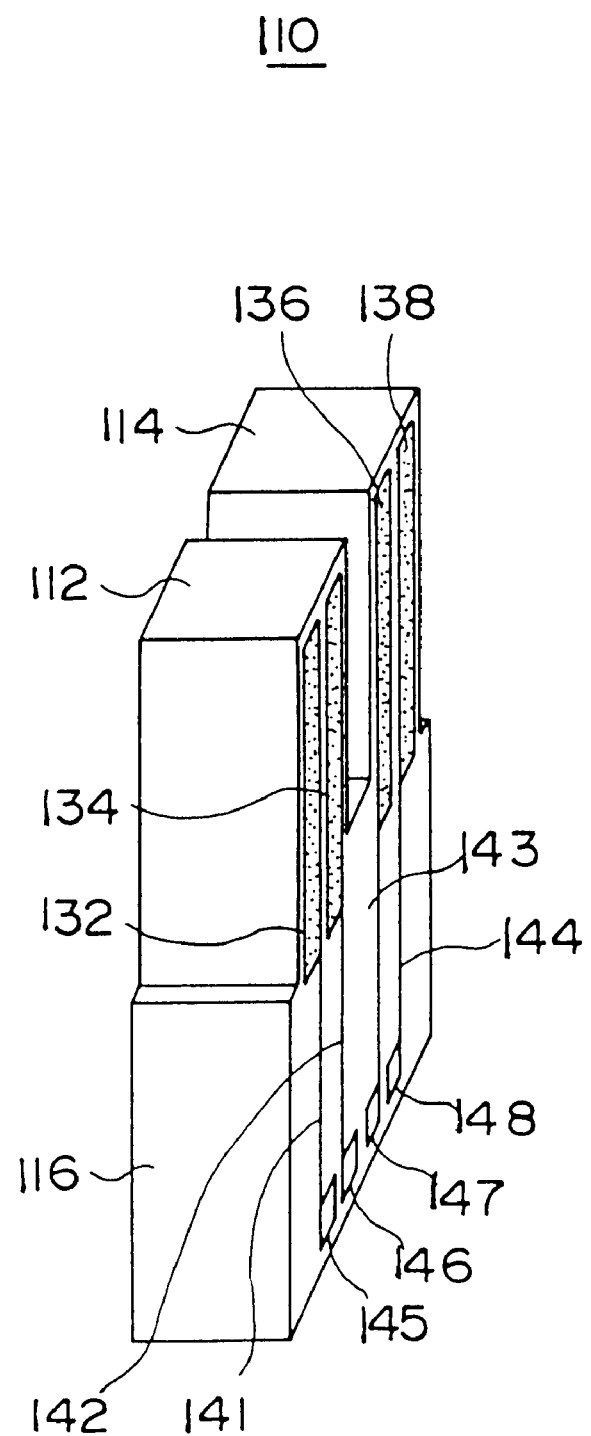
FIG. 24 is a perspective view of a tuning-fork vibratory gyro based on the principle shown in FIGS. 21A, 21B, 21C and 21D.

FIG. 24 is a perspective view of a tuning-fork vibratory gyro having the above-mentioned electrodes 131–138. In FIG. 24, there are illustrated the electrodes 132, 134, 136 and 138 provided on the front surfaces of the arms 112 and 114, but the electrodes provided on the back surfaces of the arms 112 and 114 do not appear. Reference numbers 141–144 respectively indicate lead lines connecting the electrodes 132, 134, 136 and 138 to terminals 145, 146, 147 and 148 for external connections.

It is possible to employ the following first to ninth arrangements of the electrodes 131–138.

Figure 25:
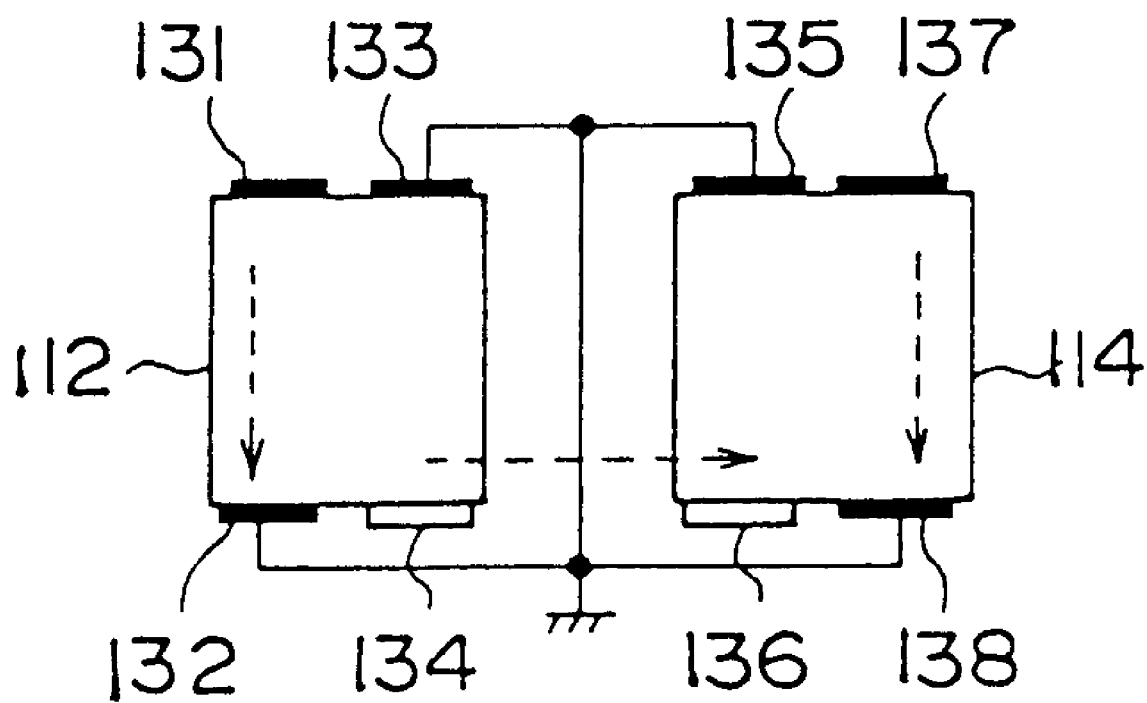
FIG. 25 is a diagram of a first arrangement of the electrodes of the gyro shown in FIG. 24.

FIG. 25 shows the first electrode arrangement. The electrodes 134 and 136 located inside of the respective centers of the arms 112 and 114 function as detection electrodes. The electrodes 131 and 137 located outside of the arm centers function as drive electrodes. The detection electrodes 134 and 136 are provided on the surfaces of the arms 112 and 114 opposite to those of the arms 112 and 114 on which the drive electrodes 131 and 137 are provided. The other electrodes are connected to the reference potential equal to the ground potential. That is, the other electrodes function as ground or reference electrodes. The arrows of broken lines denote electric fields. When a drive voltage is applied to the drive electrodes 131 and 137, the electric fields indicated by the arrows heading towards the electrodes 132 and 138 are generated, so that the arms 112 and 114 are vibrated in the $f_x$ mode. When an angular velocity is applied to the gyro, the potential difference proportional to the angular velocity develops across the electrodes 134 and 136. Since, the electrodes 133 and 135 are grounded, there is a small electrical coupling between the arms 112 and 114.

Figure 26:
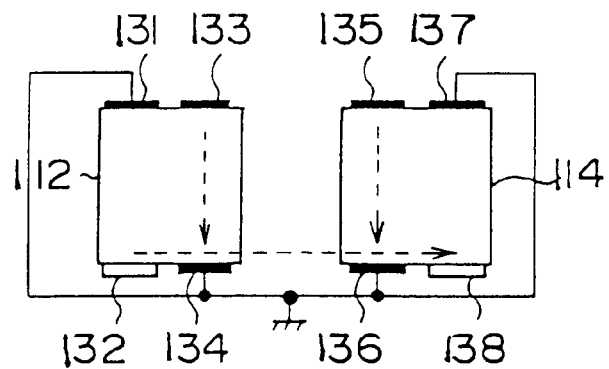
FIG. 26 is a diagram of a second arrangement of the electrodes of the gyro shown in FIG. 24.

FIG. 26 shows the second electrode arrangement. The electrodes 132 and 138 located outside of the arm centers function as detection electrodes. The electrodes 133 and 135 located inside of the arm centers function as drive electrodes. The detection electrodes 132 and 138 are provided on the side opposite to the side on which the drive electrodes 133 and 135 are provided. The other electrodes function as ground electrodes. The potential difference proportional to the angular velocity can be detected across the detection electrodes 132 and 138.

Figure 27:
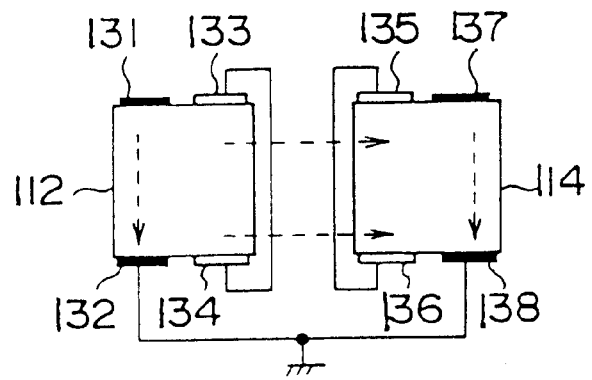
FIG. 27 is a diagram of a third arrangement of the electrodes of the gyro shown in FIG. 24.

FIG. 27 shows the third electrode arrangement. The electrodes 133 and 134 are connected together to form one detection electrode. The electrodes 135 and 136 are connected together to form the other detection electrode. The electrodes 131 and 137 function as drive electrodes. The electrodes 132 and 138 function as ground electrodes. By connecting the detection electrodes 133 and 134 together, the charges A and C shown in FIG. 22B are added. By connecting the detection electrodes 135 and 136 together, the charges E and G shown in FIG. 22B are added. Hence, the electrode arrangement shown in FIG. 26 has a sensitivity higher than that of the electrode arrangement shown in FIG. 25 or FIG. 26.

Figure 28:
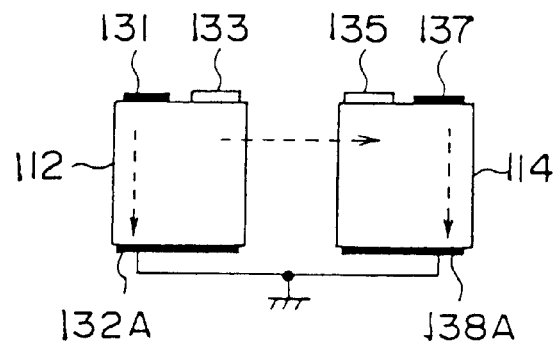
FIG. 28 is a diagram of a fourth arrangement of the electrodes of the gyro shown in FIG. 24.

FIG. 28 shows the fourth electrode arrangement. The detection electrodes and drive electrodes are provided on the same sides of the arms 112 and 114. Further, electrodes 132A and 138A are respectively provided on the opposite sides of the arms 112 and 114 so that the electrodes 132A and 138A substantially cover the whole surface portions of the arms 112 and 114. The electrodes 131 and 137 function as drive electrodes, and the electrodes 133 and 135 function as detection electrodes. The electrodes 132A and 138A are used as ground electrodes. The electric field directing from the arm 112 to the arm 114 is generated, and the potential difference proportional to the angular velocity can be obtained between the electrodes 133 and 135.

Figure 29:
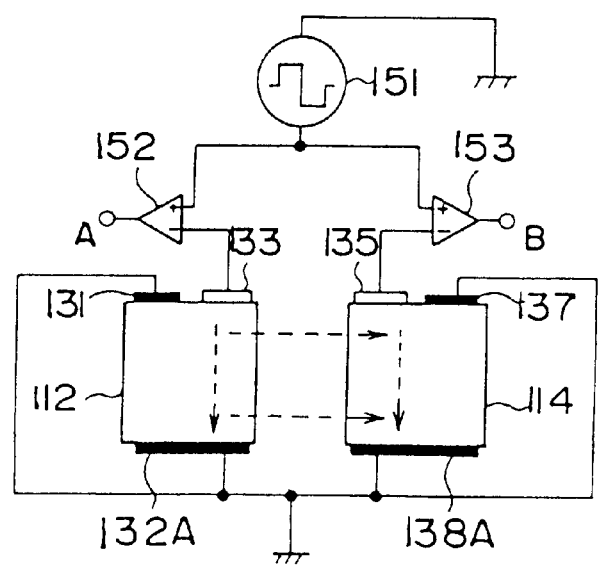
FIG. 29 is a diagram of a fifth arrangement of the electrodes of the gyro shown in FIG. 24.

FIG. 29 shows the fifth electrode arrangement, which is characterized in that each of the electrodes 133 and 135 functions as a drive and detection electrode. Hereinafter, such an electrode is referred to as a common electrode. One end of a drive source 151, which generates a rectangular wave, is grounded, and the other end thereof is connected to the non-inverting input terminals of operational amplifiers 152 and 153. The inverting input terminals of the operational amplifiers 152 and 153 are respectively connected to the common electrodes 133 and 135. The electrodes 131, 132A, 137 and 138A are grounded.

Figure 30:
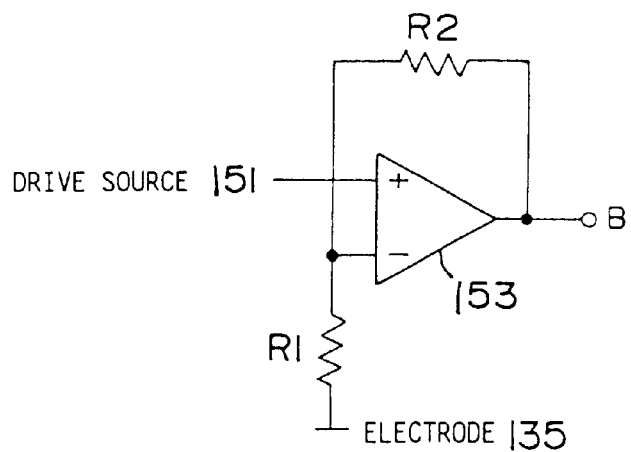
FIG. 30 is a diagram of a differential amplifier circuit used in the configuration shown in FIG. 29.

FIG. 30 is a circuit diagram of the operational amplifier 153 shown in FIG. 29. The output voltage of the operational amplifier 153 is divided by resistors R1 and R2, and a divided voltage thus obtained is applied to the inverting input terminal of the operational amplifier 153. The circumference circuit of the operational amplifier 152 is configured as shown in FIG. 30. The non-inverting input terminal and the inverting input terminal of each of the operational amplifiers 152 and 153 are in an imaginary short-circuit state. Hence, the drive voltage having a rectangular waveform output by the drive source 151 is applied to the electrodes 133 and 135 via the operational amplifiers 152 and 153. If an angular velocity is applied to the gyro which is in the above state, charges having the different polarities are respectively stored in the arms 112 and 114. The two arrows directing from the arm 112 to the arm 114 indicate electric fields caused by the charges having the different polarities stored in the arms 112 and 114. The charges stored in the arms 112 and 114 are compared with the rectangular wave of the drive signal by the operational amplifiers 152 and 153. Hence, the voltage corresponding to the difference between the potential of the electrode 133 and the potential of the electrode 135, that is, the voltage A-B proportional to the angular velocity can be obtained.

Figure 31:
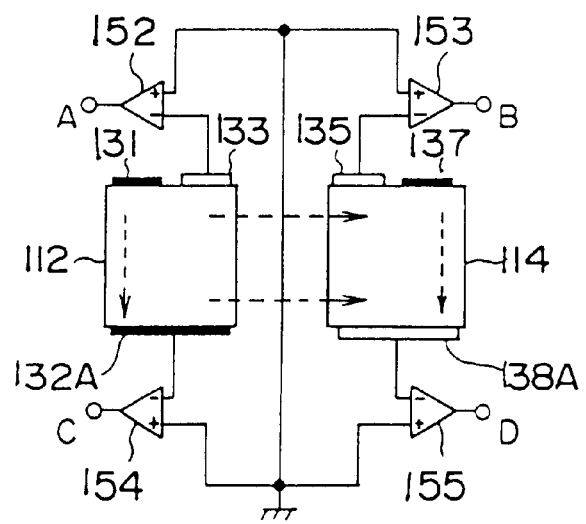
FIG. 31 is a diagram of a sixth arrangement of the electrodes of the gyro shown in FIG. 24.

FIG. 31 shows the sixth electrode arrangement, in which the potential difference caused by the charges stored in the arms 112 and 114 is detected from the front and back sides of each of the arms 112 and 114. In order to realize the above, operational amplifiers 154 and 155 are provided in addition to the operational amplifiers 152 and 153. The non-inverting input terminals of the operational amplifiers 154 and 155 are grounded, as in the case of those of the operational amplifiers 152 and 153. The inverting input terminals of the operational amplifiers 154 and 155 are respectively connected to the electrodes 132A and 138A. The drive voltage is applied to the electrodes 131 and 137. The amount of the charge generated in the arm 112 due to the Coriolis force corresponds to the sum (A+B) of the operational amplifiers 152 and 154. The amount of the charge generated in the arm 114 due to the Coriolis force corresponds to the sum (B+D) of the operational amplifiers 153 and 155. Hence, the detection output proportional to the angular velocity is equal to (A+C)–(B+D). Although the gyro shown in FIG. 31 is slightly complex, as compared with the gyro shown in FIG. 29, the gyro shown in FIG. 31 has a higher sensitivity than that of the gyro shown in FIG. 29.

Figure 32:
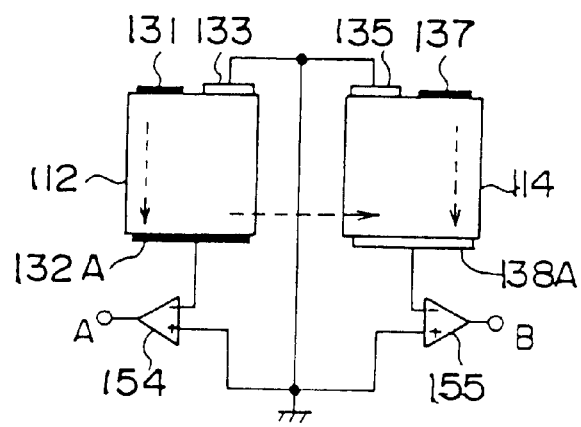
FIG. 32 is a diagram of a seventh arrangement of the electrodes of the gyro shown in FIG. 24.

FIG. 32 shows the seventh electrode arrangement, which can be obtained by simplifying the sixth electrode arrangement shown in FIG. 31. The operational amplifiers 152 and 153 shown in FIG. 31 are omitted, and the detection voltage (A–B) is obtained from one side of each of the arms 112 and 114. As compared with the sixth electrode arrangement shown in FIG. 31, the seventh electrode arrangement shown in FIG. 32 is simple, but the sensitivity thereof is slightly degraded. The terminals 133 and 135 are grounded, and thus a reduced electrical coupling between the arms 112 and 114 can be obtained.

Figure 33:
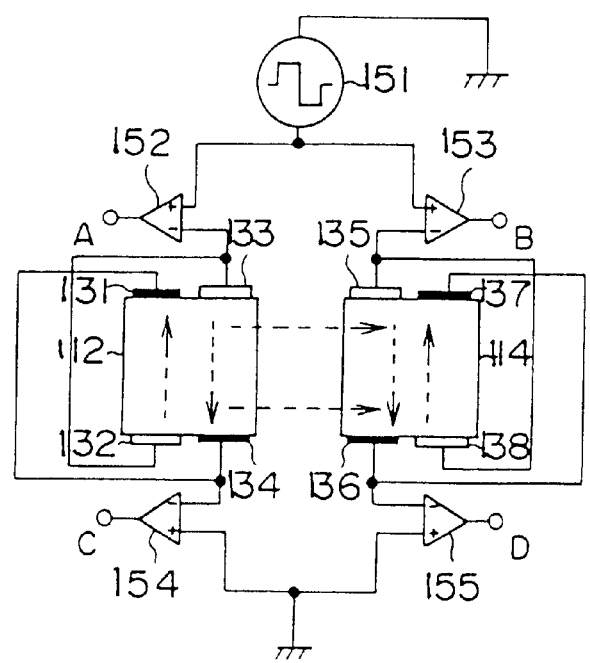
FIG. 33 is a diagram of an eighth arrangement of the electrodes of the gyro shown in FIG. 24.

FIG. 33 shows the eighth electrode arrangement, in which the electrodes shown on the two opposite surfaces of each of the arms 112 and 114 are used as common electrodes, via which the drive voltage is applied and the voltage developed due to the angular velocity is detected. The inverting input terminal of the operational amplifier 152 is connected to the electrodes 133 and 132, and the inverting input terminal of the operational amplifier 153 is connected to the electrodes 135 and 138. The inverting input terminal of the operational amplifier 154 is connected to the electrodes 134 and 131, and the inverting input terminal of the operational amplifier 155 is connected to the electrodes 136 and 137. The drive voltage is applied from both (front and back) sides of each of the arms 112 and 114, the electric fields are generated in the two directions in each of the arms 112 and 114. The Coriolis forces cause the difference between the amount of charge generated in the arm 112 and the amount of charge generated in the arm 114. The above difference can be obtained as an detection output (A+C)–(B+D). The eighth electrode arrangement has a good sensitivity, but has a slightly complex circuit configuration.

Figure 34:
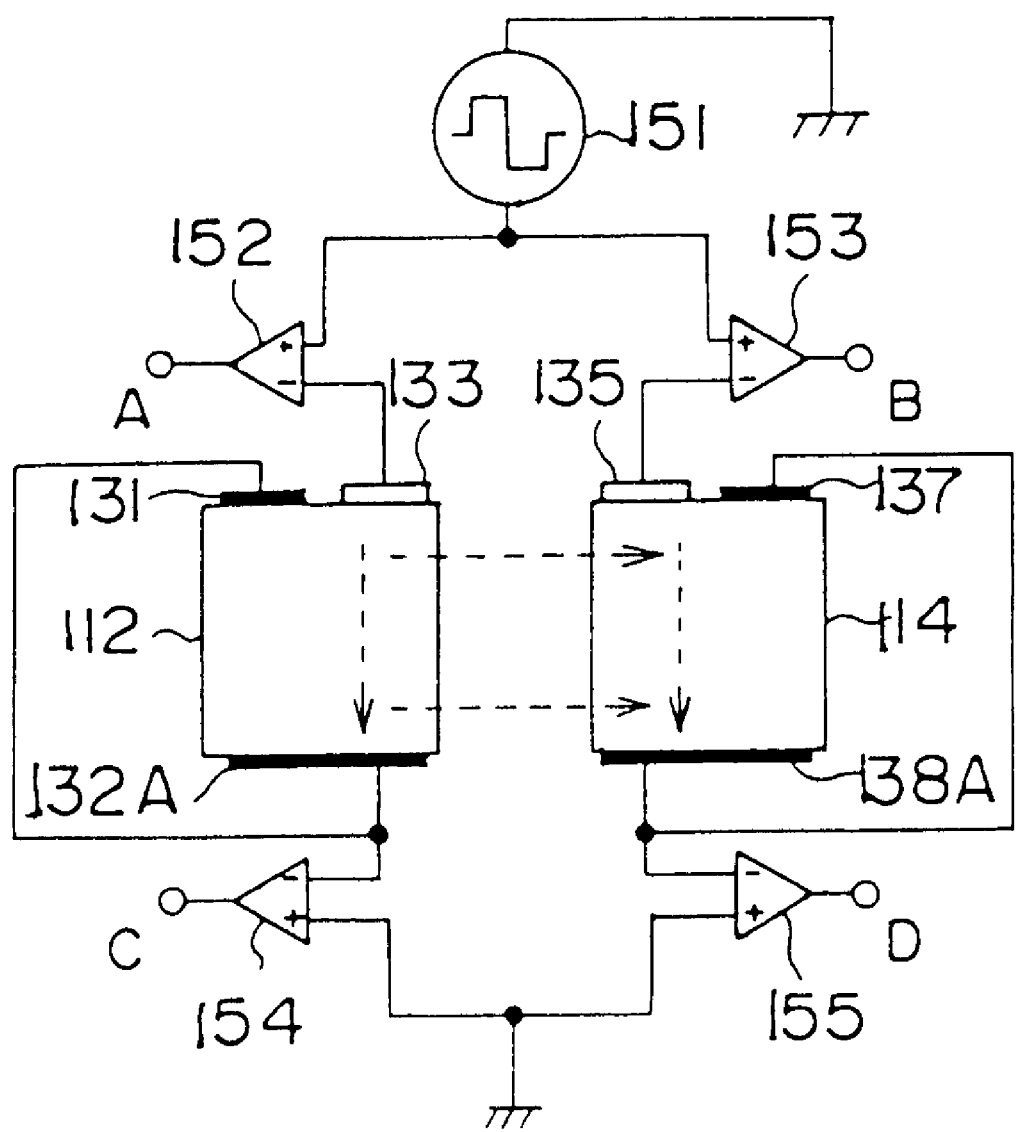
FIG. 34 is a diagram of a ninth arrangement of the electrodes of the gyro shown in FIG. 24.

FIG. 34 shows the ninth electrode arrangement, which can be obtained by simplifying the eighth electrode arrangement shown in FIG. 33 so that the drive voltage is applied from one side of each of the arms 112 and 114. The drive voltage is applied to the electrodes 133 and 135 via the operational amplifiers 152 and 153, respectively. The front electrodes 132A and 138A are provided on the surfaces of the arms 112 and 114 respectively opposite to the electrodes 133 and 135. The front electrode 132A is connected to the inverting input terminal of the operational amplifier 154 and the electrode 131. The front electrode 138A is connected to the inverting input terminal of the operational amplifier 155 and the electrode 137. The detection output proportional to the angular velocity is (A+C)–(B+D).

In the above-described first through ninth electrode arrangements, the electrodes 131 and 138 have a pattern of an identical size, and the front electrodes 132A and 138A have a pattern of an identical size. However, by taking into consideration the distributions of charges, it is possible to employ electrode patterns having different sizes.

Figure 35A:
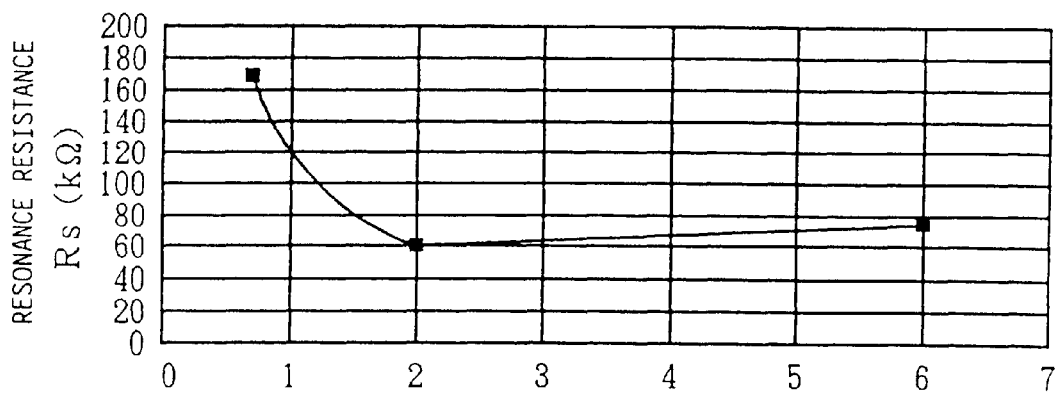
FIGS. 35A, 35B and 35C are graphs of parameters of the gyro as a function of the size of drive electrodes.
Figure 35B:
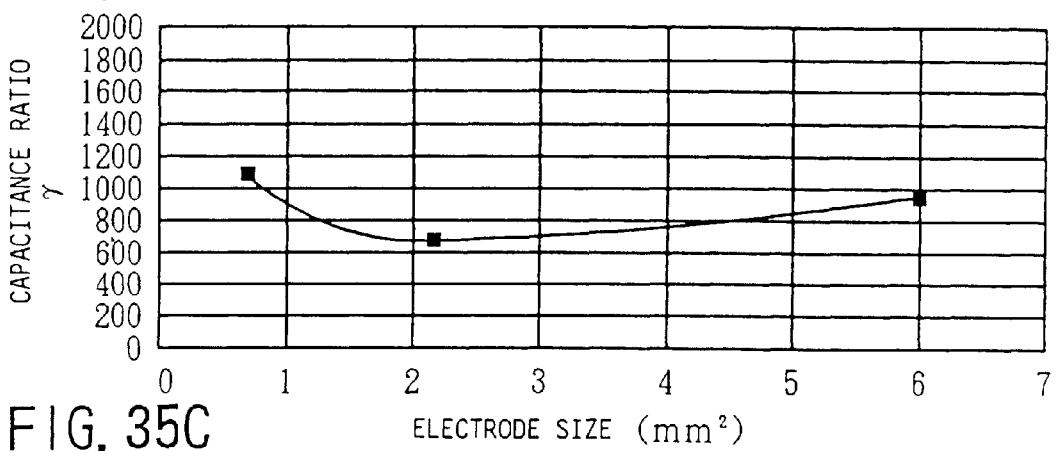
Figure 35C:
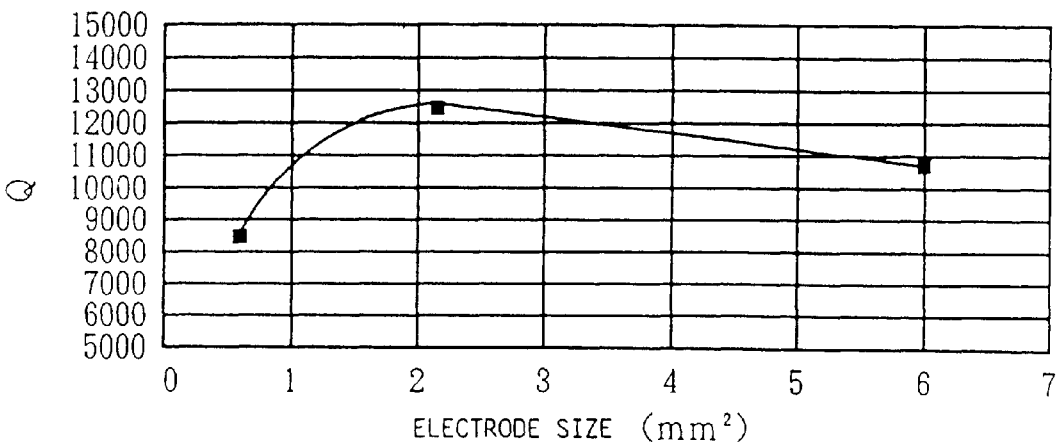

FIGS. 35A, 35B and 35C are graphs of three respective parameters as a function of the drive electrode size. More particularly, FIG. 35A shows a relationship between the resonance resistance (kΩ) and the drive electrode size (mm$^2$), FIG. 35B shows a relationship between the capacitance ratio (τ) and the drive electrode size, and FIG. 35C shows a relationship between the Q value and the drive electrode size. The electrode size was changed so as to be gradually reduced by stepwise trimming, by means of a laser beam, so that an identical area of the electrodes totally provided on the two opposite (front and back) surfaces of each of the arms. The horizontal axis denotes the electrode area per side (one of the four sides) thus obtained. When the electrode size is equal to 2 mm$^2$ and It is desirable to determine the electrode area at which the maximum Q value and minimum coupling ratio can be obtained. The width and length of each arm are respectively equal to 1.0 mm and 7.5 mm. The electrode has a width less than half the width (1.0 mm) of each arm (for example, 0.3 mm). The above shows that the $f_x$-mode vibrations can be generated even if the electrodes have a width less than half of the width of each arm.

Figure 36A:
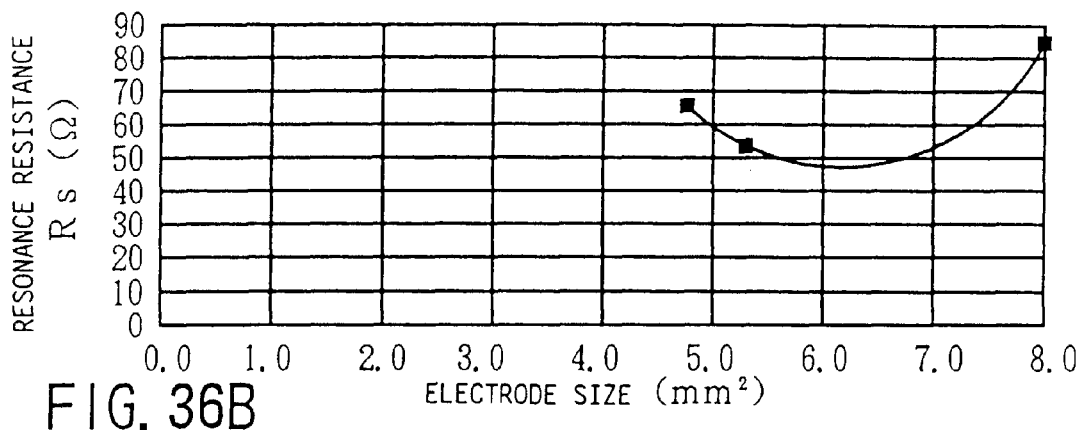
FIGS. 36A, 36B and 36C are graphs of parameters of the gyro as a function of the size of detection electrodes.
Figure 36B:
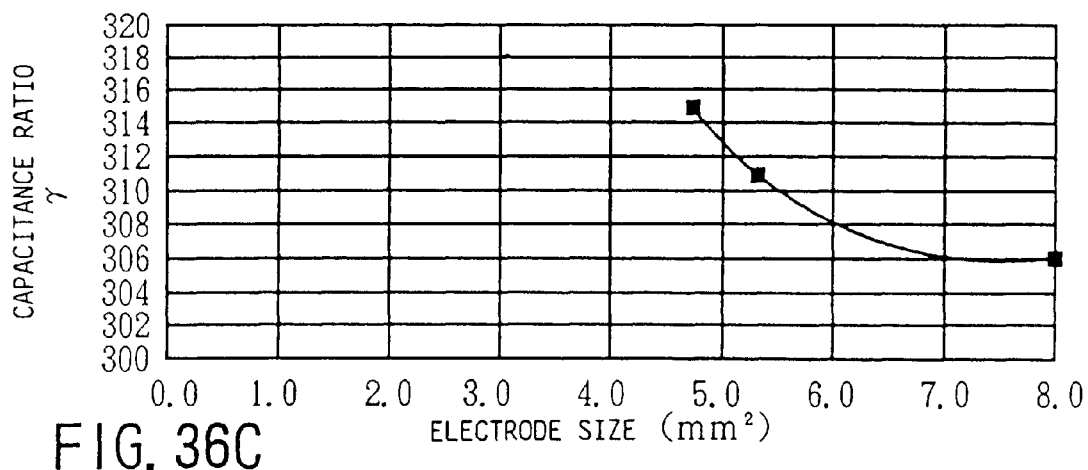
Figure 36C:
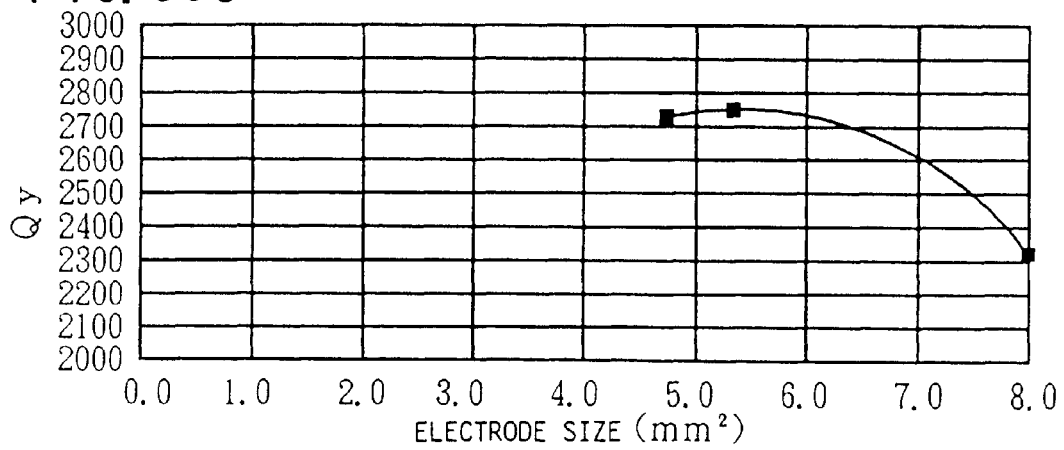

FIGS. 36A, 36B and 36C are graphs of three respective parameters as a function of the detection electrode size. More particularly, FIG. 36A shows a relationship between the resonance resistance (kΩ) and the detection electrode size (mm²), FIG. 35B shows a relationship between the capacitance ratio (τ) and the detection electrode size, and FIG. 35C shows a relationship between the Q value and the detection electrode size. The electrode size was changed so as to be gradually reduced by stepwise trimming, by means of a laser beam, so that an identical area of the electrodes totally provided on the two opposite (front and back) surfaces of each of the arms. The horizontal axis denotes the electrode area per side (one of the four sides) thus obtained. It is desirable to determine the electrode area at which the maximum Q value and minimum coupling ratio can be obtained. It can be seen from FIGS. 36B and 36C that it is desirable to use the detection electrodes that are as large as possible.

As can be seen from FIGS. 35A–35C and FIGS. 36A–36C, it is desirable that the drive electrodes be relatively small and the detection electrodes be relatively large. Hence, the capacitance ratio with respect to the detection electrodes can be reduced and the sensitivity can be increased.

The electrode arrangements having the electrodes provided on the two opposite surfaces of each arm are relatively simple and suitable for mass production while a desired sensitivity can be ensured.

The present invention is not limited to the specifically described embodiments, variations and modifications, and other variations and modifications can be made without departing from the scope of the present invention.

What is claimed is:

1. A tuning-fork vibratory gyro having first and second arms and a base integrally connected to the first and second arms, said tuning-fork vibratory gyro comprising:

drive electrodes used to generate tuning-fork vibrations due to a piezoelectric transversal effect, said drive electrodes being provided on at least one of first and second surfaces of each of the first and second arms opposite to each other;

detection electrodes provided on at least one of the first and second surfaces of each of the first and second arms and used to output a detection voltage due to an angular velocity; and reference electrodes provided on at least one of the first and second surfaces of each of the first and second arms and connected to a reference potential, wherein the drive electrodes and the detection electrodes are located in the vicinity of root portion which are bifurcated from the base, and wherein the detection electrodes are provided next to the root portions and on the opposite side of the drive electrodes.

2. The tuning-fork vibratory gyro as claimed in claim 1, wherein:

the drive electrodes are provided on the first surfaces of the first and second arms;

the detection electrodes are provided on the second surfaces of the first and second arms; and the detection voltage corresponds to a potential difference between the detection electrodes with respect to the reference potential.

3. The tuning-fork vibratory gyro as claimed in claim 1, wherein:

the drive electrodes are provided on the first surfaces of the first and second arms;

the detection electrodes are provided on the first surfaces of the first and second arms; and the detection voltage corresponds to a potential difference between the detection electrodes with respect to the reference potential.

4. The tuning-fork vibratory gyro as claimed in claim 1, wherein:

the detection electrodes are provided on the first and second surfaces of each of the first and second arms; and the detection voltage corresponds to a potential difference between the detection electrodes with respect to the reference potential.

5. The tuning-fork vibratory gyro as claimed in claim 1, wherein the drive electrodes also function as the detection electrodes, so that the detection voltage can be output via the drive electrodes.

6. The tuning-fork vibratory gyro as claimed in claim 1, wherein the drive electrodes also function as the detection electrodes, and are provided on either the first surface or the second surface of each of the first and second arms, so that the detection voltage can be output via the drive electrodes.

7. The tuning-fork vibratory gyro as claimed in claim 1, wherein the drive electrodes also function as the detection electrodes, and are provided on both the first and second surfaces of each of the first and second arms, so that the detection voltage can be output via the drive electrodes.

8. The tuning-fork vibratory gyro as claimed in claim 1, wherein the first and second arms and the base are integrally formed of a piezoelectric single crystal.

9. The tuning-fork vibratory gyro as claimed in claim 8, wherein said piezoelectric single crystal is a LiTaO₃ 40°±20° rotation Z plate.

10. The tuning-fork vibratory gyro as claimed in claim 8, wherein said piezoelectric single crystal is a LiNbO₃ 50°±20° rotation Z plate.

* * * * *

UNITED STATES PATENT AND TRADEMARK OFFICE
Certificate

Patent No. 6,484,576 B2                                                      Patented: November 26, 2002

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Masanori Yachi, Kawasaki, Japan.

Signed and Sealed this Second Day of September 2003.

HEZRON E. WILLIAMS
*Supervisory Patent Examiner*
Art Unit 2856